United States Patent
Taleyarkhan

(10) Patent No.: US 10,386,507 B2
(45) Date of Patent: Aug. 20, 2019

(54) COMPOSITIONS AND METHODS FOR DETECTING RADIATION

(71) Applicant: Purdue Research Foundation, West Lafayette, IN (US)

(72) Inventor: Rusi P. Taleyarkhan, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 212 days.

(21) Appl. No.: 15/507,509

(22) PCT Filed: Aug. 28, 2015

(86) PCT No.: PCT/US2015/047540
§ 371 (c)(1),
(2) Date: Feb. 28, 2017

(87) PCT Pub. No.: WO2016/033528
PCT Pub. Date: Mar. 3, 2016

(65) Prior Publication Data
US 2017/0248707 A1    Aug. 31, 2017

Related U.S. Application Data

(60) Provisional application No. 62/043,190, filed on Aug. 28, 2014.

(51) Int. Cl.
*G01T 5/04*    (2006.01)
*G01T 5/06*    (2006.01)
*G01T 5/00*    (2006.01)

(52) U.S. Cl.
CPC . *G01T 5/06* (2013.01); *G01T 5/00* (2013.01)

(58) Field of Classification Search
CPC .................................. G01T 5/06; G01T 5/00
See application file for complete search history.

(56) References Cited

U.S. PATENT DOCUMENTS

2009/0296871 A1\* 12/2009 Taleyarkhan ........... G01T 1/167
376/153
2013/0257213 A1\* 10/2013 Kuntz ................... H02K 16/04
310/156.35

FOREIGN PATENT DOCUMENTS

WO    2014/024707    \*  2/2014

\* cited by examiner

*Primary Examiner* — Kiho Kim
(74) *Attorney, Agent, or Firm* — Purdue Research Foundation; Zhigang Rao

(57) ABSTRACT

Tensioned metastable fluid detectors are disclosed that minimize false positive detection events. The methods involve the use of new fluids that provide improved neutron-alpha fission detection at reduced tension states. The rate of spin is also increased using a new protocol that avoids the creation of liquid imbalances in the arms of a CTMFD (centrifugally tensioned metastable fluid detector). The disclosed CTMFD radiation detection system includes a detector assembly containing a detection fluid, a base, a safety enclosure, a motor and motor mounting bracket, speed sensors, a cooling system that includes an air inlet and outlet and a safety enclosure. The CTMFD radiation detection system can include a plurality of independent detector arms having fluids with distinct Pneg requirements such that the range of detectable radiation is increased. Also disclosed are methods for detecting radiation using the disclosed CTMFD radiation detection system. Motor speed calibration procedures are also disclosed.

21 Claims, 23 Drawing Sheets

COMPOSITIONS AND METHODS FOR DETECTING RADIATION

GOVERNMENT RIGHTS

This invention was made with government support under DE-AC07-051D14517 awarded by the Department of Energy (DOE). The United States government has certain rights in the invention.

BACKGROUND

Tensioned metastable fluid radiation detectors are known However, current detectors have a higher amount of false positive detection than is desirable. New methods are needed that can be used to reduce the detection of false positives.

Nuclear radiation sensors are needed that possess over 90% intrinsic efficiency, the ability to determine in near real-time the direction of the source of radiation to within 10 degrees for a wide range of nuclear materials including spontaneous fission neutrons, gammas as well as alpha emissions, with radiation energies ranging from sub-eV to MeV. They should have the ability to remain blind to photon and cosmic interference, the ability to ascertain the characteristic multiplicity of WMD emission signals, the ability to turn on and off within microseconds so as to be feasible to operate in pulsed interrogation environments without becoming saturated. Further, they should have the ability to function in harsh environments with low false-positive detection events, the ability to selectively identify shielded or unshielded WMDs from their neutron-alpha signatures compared with state-of-the-art systems. Only 8 kg of Pu is considered to constitute a "significant" quantity, i.e., a level constituting a threat of nuclear terrorism. Consequently, the WMD threat no only requires one to be able to detect about 8 kg of Pu but also, to ensure that Pu and other SNMs special nuclear materials (like U) are not diverted.

Unfortunately, present-day radiation sensor systems as employed for combating Nuclear Terrorism are largely adaptations of systems developed for nuclear power usage for over 50 years, and do not enable a single system to respond to these needs.

Known TMFD sensor technology is based on placing ordinary fluids such as water or acetone in thermodynamic states of "tension" (not superheat) metastability under sub-vacuum conditions at room temperature. This is analogous to stretching a rubber band: the more the tension, the less is the energy required to snap the intermolecular bonds holding the material together. Thereafter, excess energy deposited from the direct strike of a nuclear particle (e.g., keV to Mev fission neutron or alpha recoil) onto a tensioned metastable fluid results in the nucleation of nanoscale (50-100 nm) critical sized bubbles [$r_c=2\sigma(Pv-Pext)$]; where, $\sigma$ is the surface tension, Pv is the vapor pressure inside the cavity and Pext is the external liquid pressure] which grow to visible (mm) size and then implode back to the liquid state accompanied by audible shock signals and light flashes which can be recorded using conventional electronics. The amount of deposited energy within a dimension commensurate with formation of a superheated vapor bubble of twice the critical radius "$r_c$" is a function of the LET of the radiation, fluid properties and Pneg.

Pneg states in the −1 bar to −10 bar range suffice for reliable, gamma-beta blind detection and even spectroscopy of neutrons from the eV to the MeV+ range and for detecting alpha recoils and fission fragments when using TMFD sensor fluids such as DFP ($C_5H_2F_{12}$), PFO ($C_8F_{18}$), acetone, R-113 ($C_2Cl_2F_3$). TMB ($C_2H_9BO_3$), methanol. Fluids such as DFP, PFO, acetone enable high efficiency (95%+ theoretical intrinsic efficiency) fast neutron detection in the fast (above keV energy), whereas, borated and/or Cl/Fl atom inclusive fluids enable neutron absorption (n,alpha and n,p leading to bubble formation) based detection of fast and thermal (sub-eV) energy neutrons. Alpha recoil and fission fragment detection for dissolved radionuclides is enabled with over 95% intrinsic efficiency with spectroscopy for all TMFD fluid types.

The Neutron Radiation (Gamma/Beta Blind) Detection Principle of TMFDs is well known. TMFDs are radically different from bubble chambers (Glaser, 1958) or superheated drop detectors (SDDs) which operate in the superheat (i.e., above boiling points) regime, and, for which the efficiency of detection of neutrons is limited by the sensitive volume of droplet suspensions which is typically ¹⁄₁₀₀₀ that for TMFDs and furthermore require minutes to hours for reset and cannot detect alpha particles or fission fragments as for TMFDs. Such attributes make TMFDs unique compared to state of the art sensors such as $^3$He & $BF_3$, (which depend on charge collection), or scintillation (e.g., NE-213 or fluor cocktail) systems.

| Ion (1 MeV) | dE/dx (MeV/cm) for ion moving through example TMFD |
|---|---|
| e (electron)-photon | 1 |
| H (proton; z = 1) | 183 |
| B (boron; z = 5) | 3,768 |
| C (carbon; z = 6) | 4,217 |
| O ( oxygen; z = 8) | 4,455 |

As can be seen, for a typical energy level of about 1 MeV associated with fission neutrons, the LET of electrons is at least 100 to 1.000 times lower than that from heavy ions, including protons, alpha particles, B, C, O, and the like. MeV gamma photons lose energy primarily via Compton scattering with electrons, and can at most deliver about 0.88 MeV even in a direct knock-on incident. The LET of 1 MeV photons interacting with C, H, O, F, Cl atoms in TMFD fluid molecules will also be in the 1 MeV/cm range. We have found that, for Pneg levels of about −2 bar through −10 bar (the threshold for detection in isopentane, the energy deposited within "$r_c$ of about 50 nm" required for recoil detection is in the range of about 10 to 100 keV. A recoiling 1 MeV carbon ion would readily be able to deposit the required about 40 keV and hence, permit detection. At Pneg of about −10 bar, even a 1 MeV recoil proton is capable of delivering the equivalent of a 250 eV carbon recoil which is sufficient for detection. However, due to the 1,000-fold lower LET for electrons and photons, it is impossible to deposit enough energy within $2 \times r_c$ length scales and as a consequence. TMFD neutron sensors must be designed to offer gamma-beta blindness even in about 10+ R/h fields. This will provide the possibility for detecting unique active photon interrogation of shielded nuclear materials.

Improved devices for reliable detection of fast (1 to 14 MeV) and thermal (eV range) neutrons in the presence of a continuous source of gamma rays (about 0.67 MeV from $^{137}$Cs, about 1.2 MeV from $^{60}$Co, about 4.4 MeV from Pu—Be and up to about MeV from $^{252}$Cf are needed. Detection must be possible in neutron fields of up to about 6-9 MeV from X-Ray sources are needed. Detection must be possible in neutron fields of up to $10^{11}$ n/s and photon emissions of over $10^{11}$ gammas's (about 5-10 R/h and even higher for X-ray interrogation fields). The first sensor system shown in FIG. 1 is based on the centrifugal force principle (also called Centrifugal Tensioned Metastable Fluid Detector or CTMFD).

SUMMARY OF INVENTION

Tensioned metastable fluid detectors are disclosed that minimize false positive detection events. The methods involve the use of new fluids that provide improved neutron-alpha fission detection at reduced tension states. The rate of spin is also increased using a new protocol that avoids the creation of liquid imbalances in the arms of a CTMFD (centrifugally tensioned metastable fluid detector). In addition, the detectors have improved IR-diode transmitter-receiver combinations that provide for improved detection. The CTMFD detectors also include venting in the detector housing to reduce heat build-up as the device is used.

A CTMFD radiation detection system disclosed that includes a detector assembly containing a detection fluid, a base, a safety enclosure, a motor and motor mounting bracket, speed sensors, a cooling system that includes an air inlet and outlet, and a safety enclosure. The detector arms include a bulb joined to a neck and arms, wherein the interior of the neck is convex (to prevent gas entrapment) and joins the bulb to the arms. In an embodiment the detector comprises a protective coating (such as pvc cement) and also can include support braces between arms. The detection fluid in the arms extends above elbows that connect the upper and lower halves of the arms. The detector can also include a fill spout as well as an expansion volume in each arm (to enable compensation for temperature variations leading to fluid expansion or contraction) and for replacing or substituting detector fluids in the detector. In certain embodiments the detector arms can have an internal diameter in the multi-mm range (the smaller the diameter the longer the time for gas bubbles to evacuate leading to increased dead time between detection events; however, the smaller diameter also enables improved shock cushioning to avoid impulse loadings to the system leading to possible glass fracture); glass thickness is chosen to be in the 1-3 mm range to enable stiffness without fracture.

The base of CTMFD radiation detection system can include an air intake shaft having bubble sensor holes, vibration dampeners, a holder for a liquid temperature measuring device, shaft supports and attachments for a safety enclosure. The base can also be configured to include an vibration dampeners comprising suction cup feet and other vibration damping materials to serve as sound dampening to enable quieter operations as desired.

Suitable detection fluids for the CTMFD radiation detection system include R-113, acetone, ethylene chloride, isopentane, methanol, trimethyl borate, PFO, DFP and their mixtures.

The CTMFD radiation detection system can include an infrared temperature sensor which can be positioned next to the detector bulb (or arms) or affixed onto it with a wireless transmitter for dynamically measuring the temperature of the detection fluid leading to corrections for expansion-contraction. Expansion leads to meniscus separation to decrease requiring higher (inversely proportional) spin speeds to enable a constant multiple of the product of the density times square of the product of meniscus separation times the spin speed to then allow maintaining the desired tension state. Detection thresholds are also enabled for temperature effects via knowledge of the variation of hvap (enthalpy of vaporization) with the required tension pressure (Pneg). Higher temperatures lead to lower demands on Pneg because the excess energy via tension needed for bubble formation from a given nuclear particle is reduced. And vice-versa.

In certain embodiments the internal diameter of at least a portion of the tubing in the upper arms is increased relative to the internal diameter of the tubing of the lower arms. In certain embodiments the upper arms can contain a bulb region.

In certain embodiments the CTMFD radiation detection system can have a detector that includes a plurality of independent detector arms having fluids with distinct Pneg requirements such that the range of detectable radiation is increased. This embodiment is referred to as the multi-arm CTMFD or MAC-TMFD. For such situations to each bulb is affixed an IR transmitted-detector together with a wireless transmitter to relay onset of bubble formation information to an external control-data monitor.

In certain embodiments the CTMFD radiation detection system can be portable and can contain a battery that powers the motor. In certain embodiments it can contain a battery that powers the motor and a separate battery that powers a control microprocessor and display screen. In certain embodiments the CTMFD radiation detection system can include a pulse width modulation control mechanism for controlling motor power.

Also disclosed are methods for detecting radiation using the disclosed CTMFD radiation detection system wherein the motor is accelerated in steps that take a sufficient amount of time to avoid false detection events, such as about 4 seconds or more depending upon the detector configuration. The acceleration of the motor can be controlled by a transistor circuit that truncates part of the waveform from the AC power. The method can further include a calibration step for controlling detector acceleration involving running the motor at a plurality of delay values and measuring the detector speed. The method can also include a step for calibrating the motor speed as a function of the heat of the motor.

Also disclosed is information that allows avoidance of spurious bubble formation on start caused primarily by mechanical dimensional variations between arms. Uneven distribution of dimensions around the central bulb leads to uneven mechanical force fields during acceleration to desired spin speeds. This can lead to fluid in separate arms to accelerate differently in impulse manner. Such impulse can lead to liquid in the upper arm of one of the two arms to deviate below the elbow region which then can create a suction effect for air-gas from ambient to be transported into the central bulb leading then to a false positive detection event. The rate of acceleration is thus, to be calibrated for CTMFD apparatus based on degree of deviation of dimensions between the two diamond shaped arms connected to the central bulb. In the ideal sense, with perfect mirror symmetry, the rate of acceleration of spin speed can be as high as the drive motor can tolerate. For real-life especially glassware made by hand, deviations from perfect mirror symmetry must be compensated for avoidance of false-positives. Deviations from mirror symmetry can also lead to vibration during spinning and enhanced wear on bearings as well as noise which can be compensated by balancing attachments and vibration dampers.

DETAILED DESCRIPTION OF INVENTION

The term "about" general means within 10% of the number unless the context of its use indicates otherwise.

Figure 10:
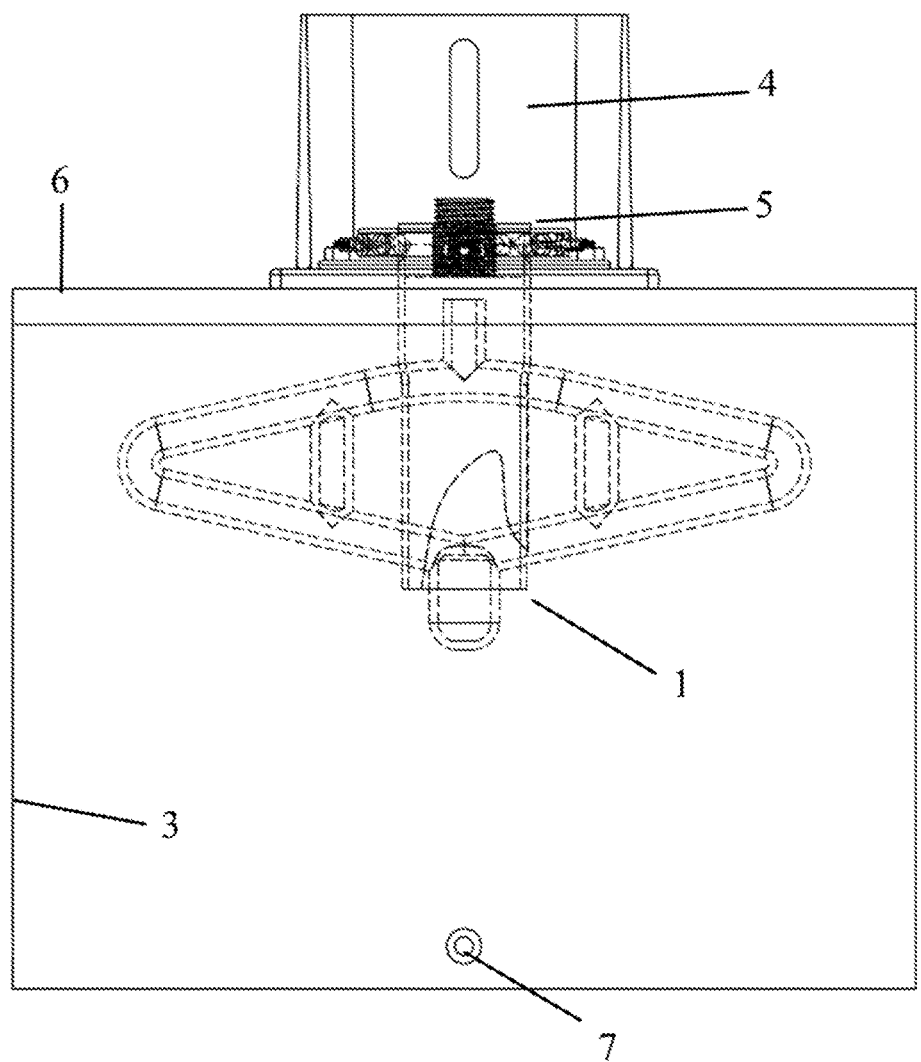
FIG. 10 provides an illustration of a basic hardware configuration for the described system.
Figure 11:
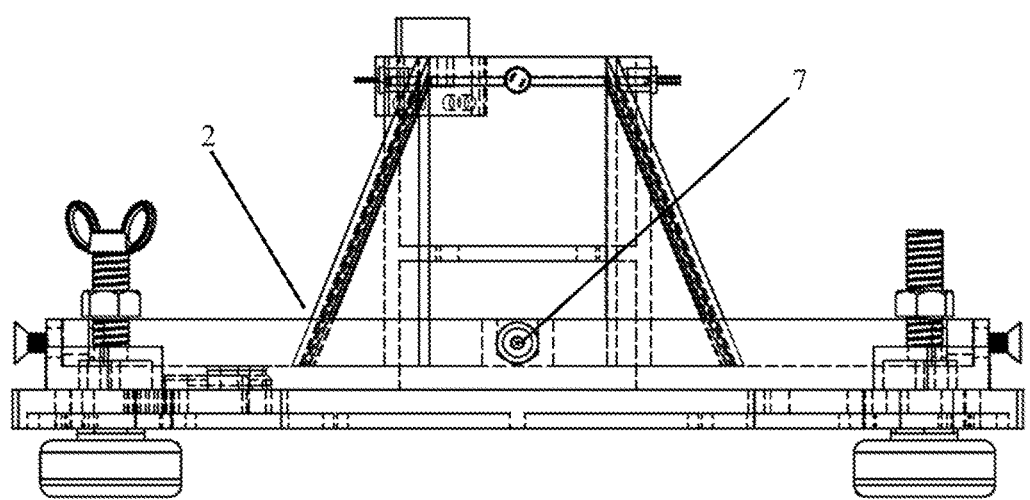
FIG. 11 provides an illustration of a basic hardware configuration for the described system.

A hardware configuration for a CTMFD system is described with reference to FIGS. 10 and 11 which provide an illustration of components of an embodiment of the present invention. With reference to the numerals in FIGS. 10 and 11, the system generally includes a detector assembly 1, a base 2, a safety enclosure 3, a motor mounting bracket 4, speed sensors 5, air outlet 6, and connection points 7 for base 2 and a safety enclosure 3.

Figure 12:
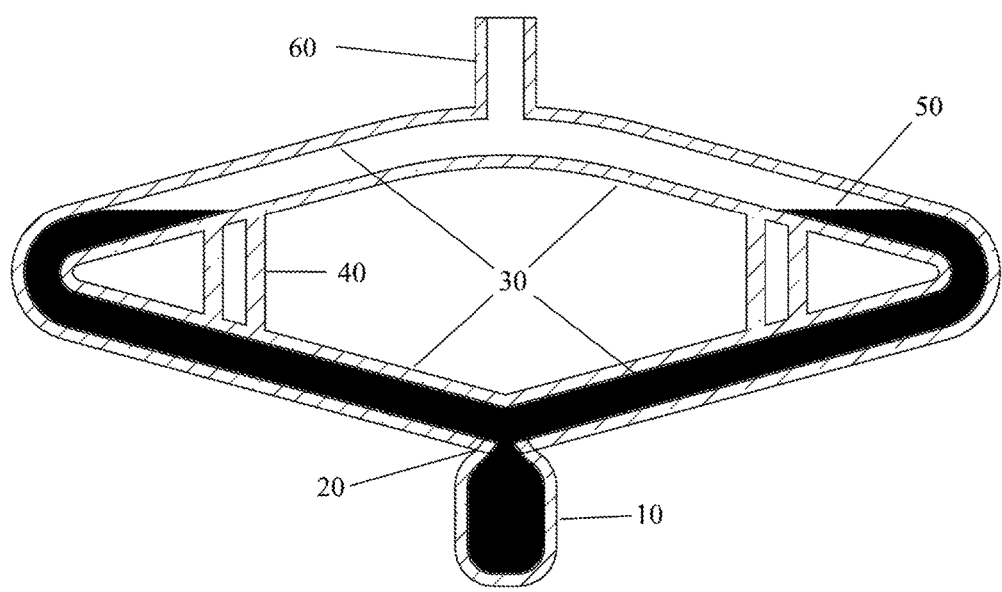
FIG. 12 provides an illustration of a detector.

FIG. 12 illustrates detector assembly 1 in more detail. Detector 1 detects radiation. Detector assembly 1 which is filled with a detection fluid 70 is spun by a motor to become sensitive to radiation of certain types. Detector assembly 1 can be made of any material that can withstand the centrifugal forces during use and that is stable to detection fluid 76. It includes a bulb 10 that houses the sensitive volume of the detector in which the detection events occur. As such bulb 10 must be made of a sufficiently transparent material, such as glass, in which the detection events can be detected. Shown in dark is fluid 70 which fills bulb 10 and partially fills arms 50 such that when the detector assembly 1 is spun at sufficient speeds, bubbles will form in bulb 10 when in the presence of radiation.

Still referring to FIG. 12 a neck 20 is shown. Neck 20 is the connection area between bulb 1 and the arms 80 and remainder of the detector. One feature of the neck is that it must be convex throughout its interior. This is allows bubbles created from detection events to be removed to reset the detector. If there is concavity in the neck, bubbles can become stuck in the neck preventing additional detection. This is also true for the location where the two arms 80 come together in the vicinity of neck 20 to form a "V".

Also shown in FIG. 12 is a protective coating 30 on arms 80. Protective coating 30 can be used to lessen the risk of projectile glass fragments in the event glass detector 1 breaks. Curable liquid polymers can be used to cover the entire glass detector 1 exterior by dipping. Once hardened, coating layer 30 provides containment in the event of detector assembly 1 failure.

Detector assembly 1 can also include support braces 40. Solid braces 40 connected to arms 80 of the detector 1 provide additional structural stability and help to maintain level rotation of the detector.

Also shown in FIG. 12 is elbow 50 which connects the lower and upper halves of arms 80 of the detector. The connection of the lower and upper halves of the arms 80 of glass detector 1 is important for the function of the detector. First the liquid 70 level must be above elbow 50 for negative pressure generation in the liquid to be possible. Any symmetry can be used in elbow 50 that provides balanced rotation of the detector assembly 1.

Detector assembly 1 also can include a fill spout 60. Fill spout 60 is used to introduce the detection fluid 70 into the detector. A detector 1 with an open fill spout allows fluid 70 to be swapped. The fill spout can also be sealed to prevent fluid 70 loss.

As can be appreciated balance can greatly affect the performance of the detector. Imbalance has been shown to increase the likelihood of vibration, false positive detection, mechanical failure and detector breakage, sensor failure, and software failure. When constructing the glass detector the center of mass should be on the axis of rotation. The fill spout and the bulb should be aligned and the two elbows should be level. In reference to the sensor failure, if the detector is imbalanced, the bulb will wobble which causes changes in refraction of the bubble detector light beam. These changes in refraction cause the signal to oscillate requiring averaging thereby decreasing the sample rate of the bubble sensor (since it takes longer to make a confident measurement) and increasing the probability of reading incorrectly.

It has been discovered that the inner diameter in the glass tubing of arms 80 affects operation of the device. Larger tubing having an internal diameter of about 6-8 mm ID or more allows bubbles to escape more quickly allowing for less dead time between detection events.

Another factor that has been discovered with respect to the construction of the detector 1 is size proportions. The ratio of the radius of the bulb to the radius of the arms can have an effect on the detector response. In order to scale the size of the detector, if similar detector response is desired, this ratio should be maintained otherwise additional calibration may be needed.

Figure 13:
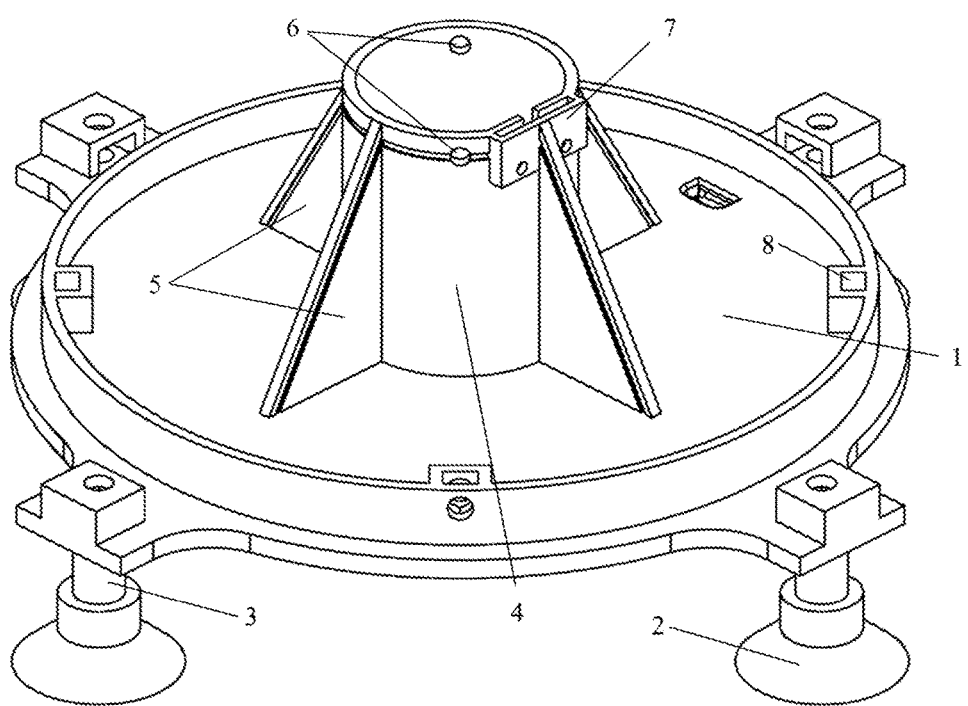
FIG. 13 provides an illustration of a detector base.

An illustration of base 2 can be found in FIG. 13. Base 2 provides the connection point for safety enclosure 3, a cooling inlet (not shown), vibration stability, and mounting location for sensors. Generally base 2 includes feet 20, vibration dampeners 300, an air intake shaft 400 having a hole through the base of its interior, shaft supports SOW, bubble sensor holes 600, holder for a liquid temperature measuring device 700, and threaded attachment points for safety enclosure 3.

Base 2 provides a variety of functions including a sufficiently wide firm base to hold the detector in place during operation. It has vibration dampeners to absorb vibration which stabilizes the device and helps to prevent false positive detection. The base provides alignment to the safety enclosure and proper placement of the sensors. The base also houses the cooling air intake shafts 400. The base can be made of any suitable material, such as plastic or glass.

Vibration dampening can be provided, in part, by feet 200 of the base which can be suction cups along with vibration dampeners 300. Suction cup feet 200 prevent the detector from moving while in operation. The high speed motor in the device creates rotational forces on the enclosure. The suction cup feet 200 prevent the enclosure from moving while operating but at the same time are easily removable to allow for repositioning of the device and convenient replacement of the feet.

Vibration dampeners 300 are used to connect the suction cup feet 200 to the plastic base. Preferably they are vibration dampening threaded couplers. The vibration dampeners 300 also help to stabilize the device and prevent false detection events.

Air intake shaft 400 is the cylindrical shaft in the middle of the base that provides intake air for the detector cooling system. The rotation of the detector pushes air to the outside and naturally draws air in through a hole which can be in the center of the base. This cooling process can be aided by a fan which can be placed in the air intake shaft 400.

Shaft supports 500 connected to the horizontal base section and the vertical outside walls of the air intake shaft 400 can be used to provide support to the air intake shaft and provide stability for the shaft which may need extra structural stability if it is made from plastic. The shaft supports also provide a convenient location to run wires from the sensors located on the shaft. The supports can be made with channels to place wires for this purpose.

Aligned bubble sensor holes 600 are used for detecting bubble formation that occurs in response to incident radiation. Bubbles can be detected visually but more preferably bubbles are detected using a light transmission sensor which passes light through the holes 600 and the bulb 10 of the detector 1 and collects it on the other side. The air intake shaft 400 on the plastic base contains suitably located and sized holes for the bubble detection sensors to be held in place and aligned.

Liquid temperature sensor holder 700. The liquid temperature can be conveniently measured with an infrared noncontact temperature sensor. This sensor generally should be aligned with the centerline of the detector bulb. The base can have a mounting location for this sensor. The housing for the non-contact temperature sensor also can include a thermocouple which can be used to measure the air temperature of cooling air that has passed by the detection bulb 10 to cool it.

Threaded attachment points 800 for safety enclosure can include threaded attachment points facilitating attachment of the safety enclosure 300 to the base using conventional hardware, such as bolts. The base then becomes the bottom portion of the safety enclosure 300.

Safety enclosure 3 performs several functions. First of all, it provides a safety barrier between the user and the rotating detector. In the event that the detector assembly breaks for some reason, the safety enclosure is meant to contain and withstand the impact of any fragments. The lid of the safety enclosure 3 also can provide the mounting location for the motor mounting bracket 4. As such, safety enclosure can be made of any material that can adequately perform these functions including safety glass, metal or suitable plastics.

Motor mounting bracket 4 provides a stable, adjustable, location for holding the motor used to spin the detector 1. It can be made of any material that can achieve this purpose. The motor mounting bracket 4 is usually centered on the safety enclosure 3 so that the alignment of the sensors on the base are properly maintained.

Speed sensors 500 are mounted on the motor mounting bracket. In one embodiment two reflective sensors measure the rotation of the top of the detector assembly. The speed can be measured by covering the top of the detector assembly with light absorbing material except for a small strip of reflective material. Once per revolution of detector 1 light from the emitter is reflected back to a detector creating a change in detector response. The frequency of the reflections provides an indication of the rotational speed.

Air outlet 600 allows air to be pushed out as the detector 1 spins and naturally pushes air to the outside. This allows cooling air to enter through a hole in the bottom of the base 2 into the air intake shaft as the warm air exits the outlet of the lid of the safety enclosure. At the location of this air outlet, a thermocouple can be used to measure the outlet air temperature.

Connection points for base 2 and safety cylinder 700 are used to connect safety cylinder 7010 to base 2 using conventional hardware at several locations to hold enclosure 3 in place and to maintain the alignment of the detector axis of rotation.

Figure 14:
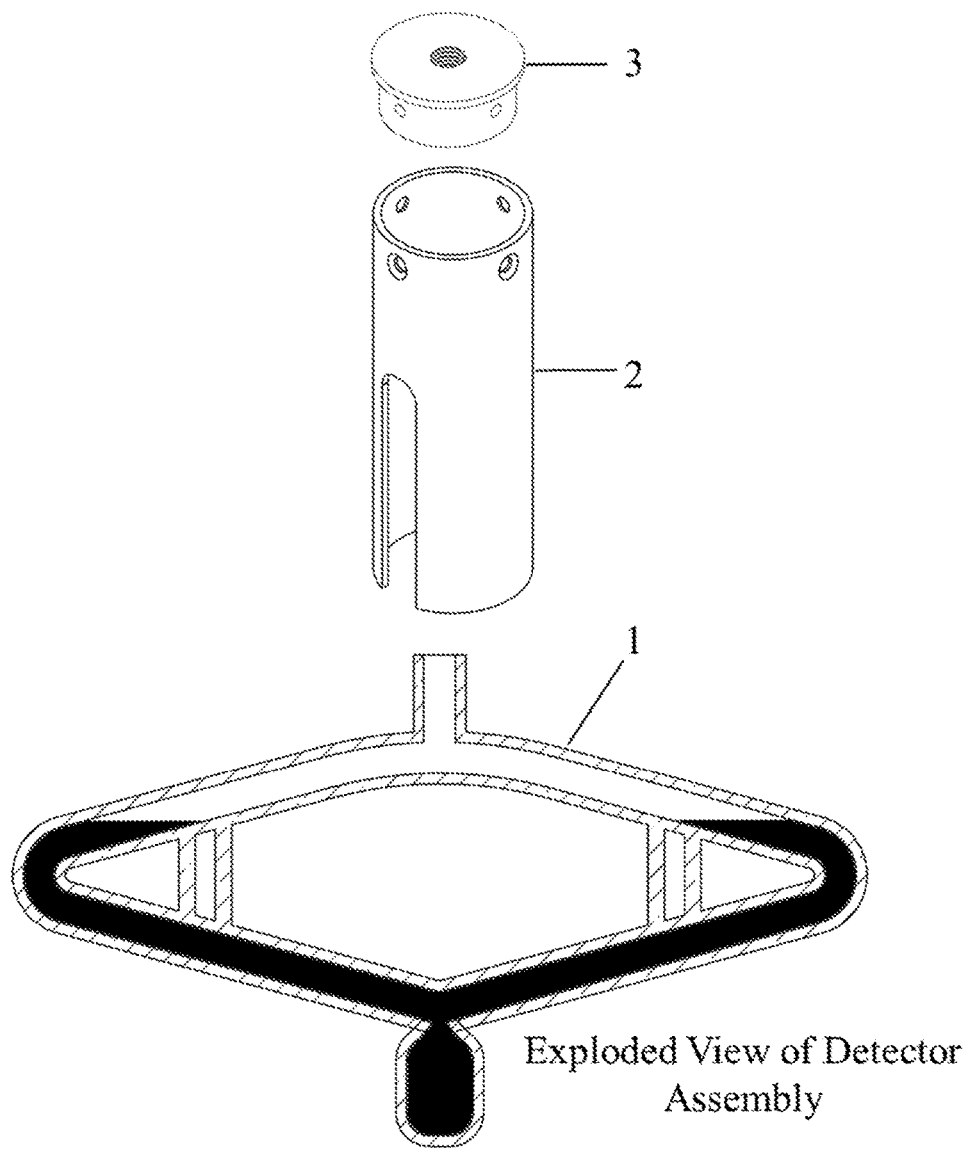
FIG. 14 provides an illustration of a detector assembly for a CTMFD system.

The connection between detector 1 and motor mounting bracket is illustrated with reference to FIG. 14. As mentioned previously detector 1 detects radiation and is spun by a motor to become sensitive to that radiation. Metal holder 2000 is adhered to the detector 1 and provides the mechanism for attaching detector 1 to the motor. Threaded connector 3000 then provides for the metal holder to connect to the threaded end of a motor shaft. The threaded connector is removable to provide access to the top of detector 1 to allow changing fluids.

One of the liquids has found use in the liquid chamber of detector 1 is isopentane which has been discovered to have a relatively modest Pneg requirement (e.g., −2 bar for fast neutrons and alphas) and is readily available and easy to use. In addition, a mixture of trimethylborate combined with methanol and isopentane finds use such that (n,α) reactions from neutron capture by $^{10}B$ can be taken advantage of.

Improved portable, hand sized table-top detection systems have also been developed and are now described herein. The reported systems provide reliable detection of fast (1 to 14 MeV) and thermal (eV range) neutrons in the presence of a continuous source of gamma rays (about 0.67 MeV from $^{137}Cs$ and about 1.2 MeV from $^{60}Co$, about 4.4 MeV from Pu—Be and up to about 9 MeV from $^{252}Cf$ and can be carried out in neutron fields including photon backgrounds emissions of over $10^{11}$ γ/s (about 5-10 R/h fields).

Figure 1:
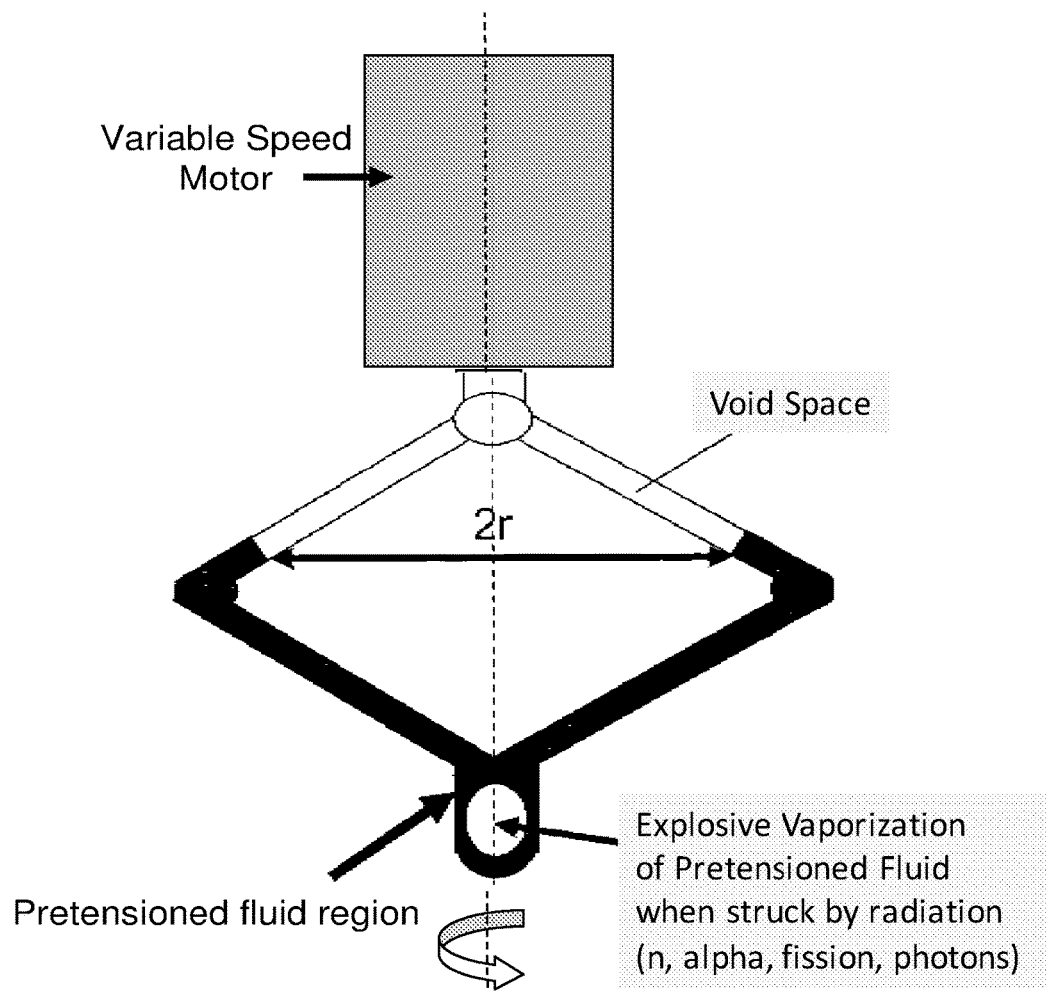
FIG. 1 provides a diagram of a CTMFD detector.

The first sensor system shown in FIG. 1 is based on the centrifugal force principle and is known as a Centrifugal Tensioned Metastable Fluid Detector or CTMFD. The CTMFD can have multiple arms in which the CTMFD central sensing volume is segmented into multiple sections, each acting independently, thereby, expanding a single TMFD footprint to multiple detector units.

The second design is referred to as the Acoustic Tensioned Metastable Fluid Detector or ATMFD. The ATMFD) induces liquid tension using resonant acoustic pressure fields in a chamber having a geometry and volume resembling a coffee mug, 100 to 500 mL.

Figure 2:
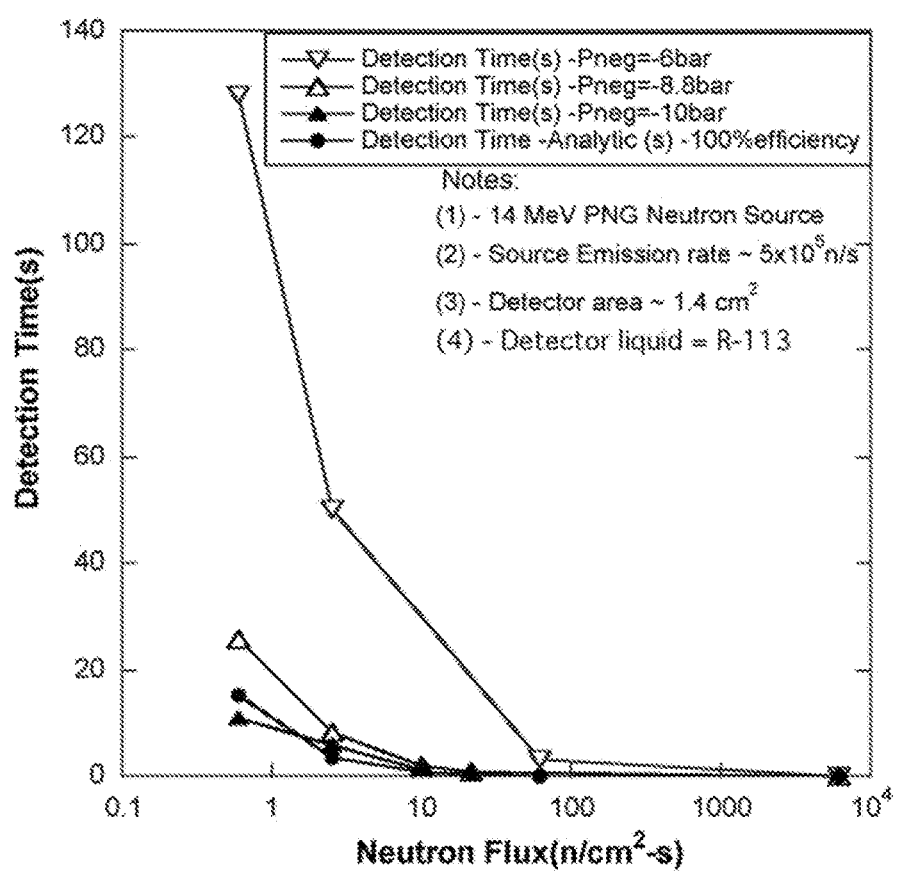
FIG. 2 shows a graph of detection time versus neutron flux for a 14 MeV neutron flux.
Figure 3:
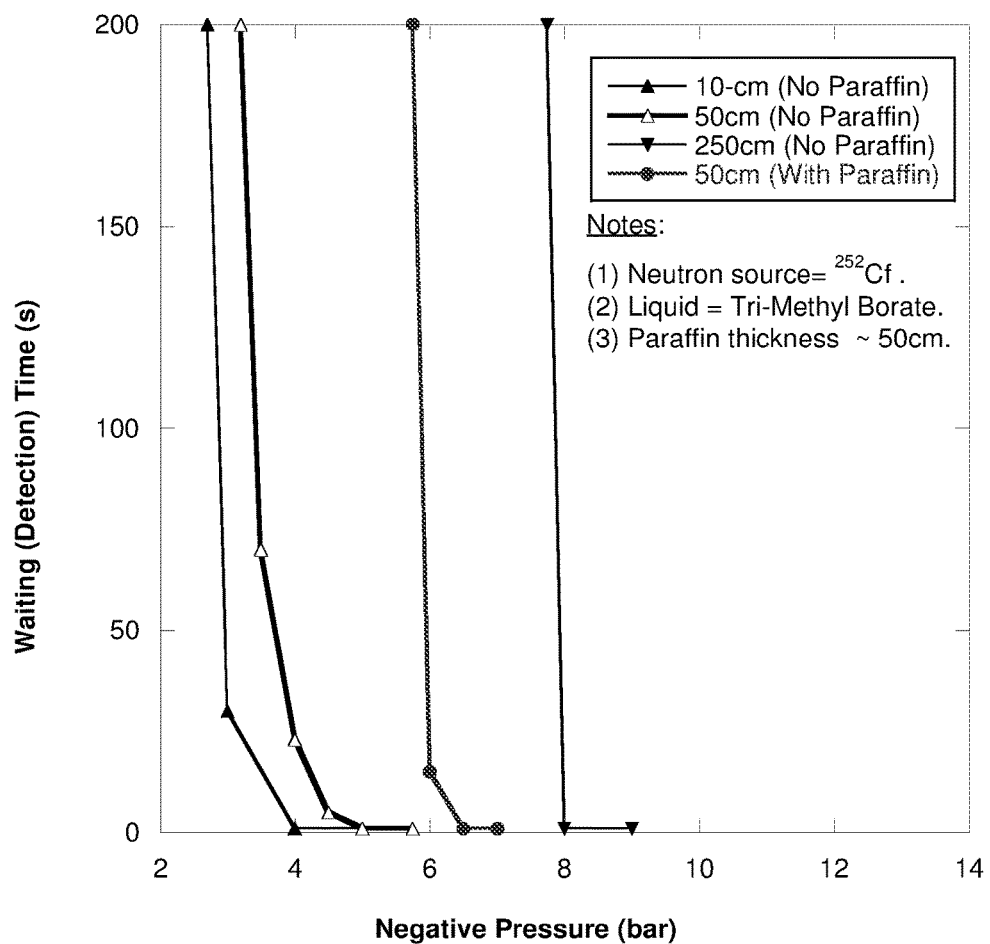
FIG. 3 shows a graph of waiting time versus Pneg in the detection of neutrons from $^{252}$Cf.
Figure 4:
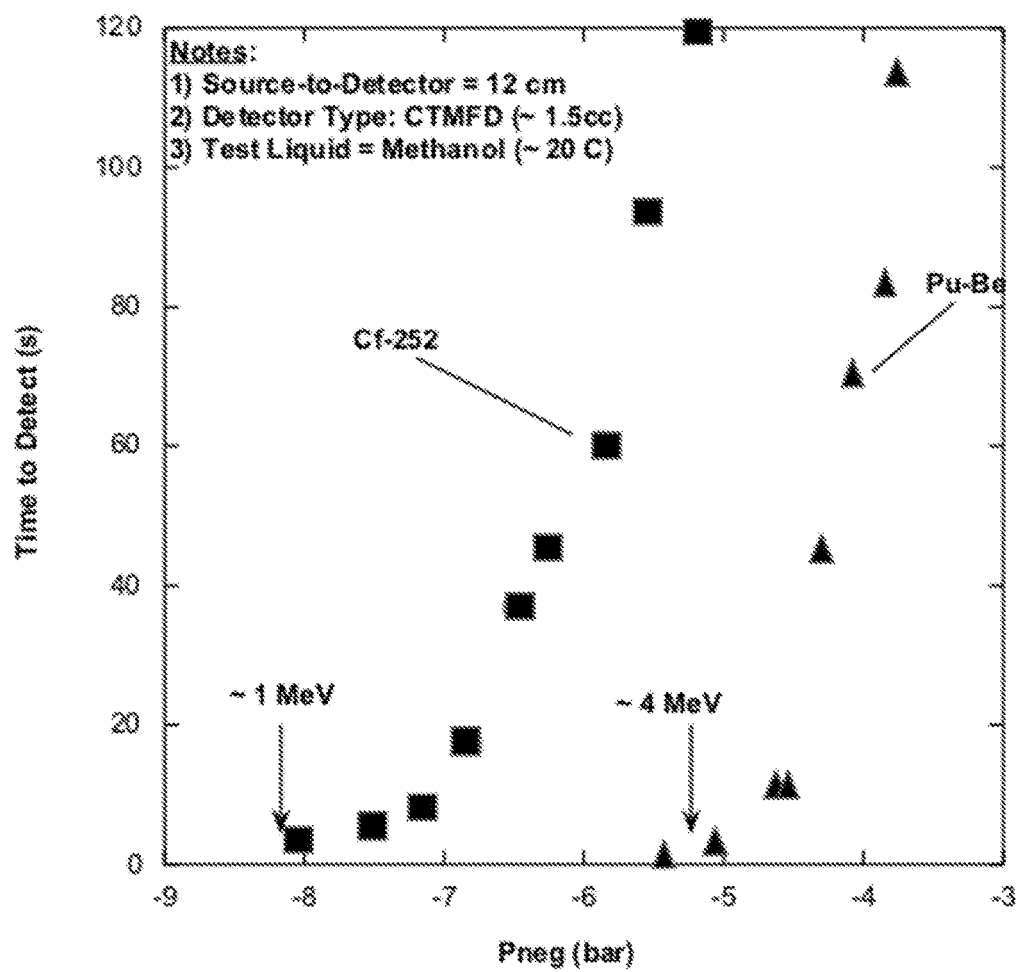
FIG. 4 shows a graph of the time to detect versus Pneg for the detection of $^{252}$Cf.

FIG. 2 shows the results of tests with detection of neutrons from a D-T pulse neutron generator (PNG −14 MeV neutrons) using a 1 mL CTMFD and R-113 ($C_2Cl_3F_3$) as the detection fluid. With Pneg of −8.8 bar 14 MeV neutrons could be detected with about 100% of the theoretical maximum intrinsic efficiency; the efficiency dropped rapidly to about 15% at −6 bar—detecting only close to head-on neutron collisions. The surprisingly sharp increase m efficiency for almost all angles at modest Pneg increases is seen. A 50% change (−6 bar to −9 bar) results in about a 100% improvement. Shown in FIG. 3 is the result when tri-methyl borate (TMB) is used as the detector fluid. With $^{252}Cf$ fission spectrum neutrons having thermalized neutrons (with Pneg of about −6 bar) and fast neurons (Pneg of about −4.5 bar) are readily be detected using the same TMFD. Down-scattered neutrons can be detected via $^{10}B(n,\alpha)^7Li$ dominated assisted nuclear reaction energy, whereas, fast (>0.1 MeV) neutrons are detected via elastic scattering as the dominant detection mode. Both modes operate in tandem. FIG. 4 provides evidence of potential for relatively straight-forward neutron spectroscopy via direct Pneg scanning.

Fluid Selection

The selection of tensioned metastable fluid detector (TMFD) sensor fluids can be based on the desired temperature of operation and the need for monitoring for fast and/or thermal neutrons. As a baseline, the boiling temperature (Tb) must not be exceeded typically remaining about 10-20° C. below Tb. The fluid must also be used over its freezing point. While fast neutrons are readily detected via elastic collisions, thermal neutron detection requires an energetic nuclear reaction for example, (n,p), (n,α) or fission. Use of Cl as one of the constituents provides for detection via (n,p) reactions; use of $^{10}B$ or $^6Li$ as one of the constituents provides for detection of (n,α) reactions. It is possible to include such these atoms in non-radioactive form within TMFD sensor fluid molecules. The metastable tension (negative) pressure (Pneg) levels necessary for detection of thermal neutrons are generally lower by about −2 bar than those for MeV scale fast neutrons. In addition, the wait time curve depicts a sharp inflexion due to the monoenergetic nature of thermal neutron induced reaction products compared with a gradual slope for MeV neutrons spanning a range of energies from (α,n) or fission nuclear reactions.

Unless environmental conditioning is enabled (e.g., via use of commonly used thermal management approaches), no single TMFD sensor fluid will (on its own) offer functionality over the entire range of temperatures. However, it has been discovered that neutron detection over a range of environmental temperatures spanning −40° C. to +70° C. can be conducted using the solvents in the table below.

TABLE 1

Estimated Pneg Values For Select TMFD Fluids And Temperatures Ranges

| Fluid | Freezing/Boiling Point (° C.) | Operating Temperature Range (° C.) | Pneg (Bar) |
|---|---|---|---|
| R-113 | −35/48 | −30 to 30 | −3.5 to −2.6 |
| Acetone | −95/56 | −40 to 40 | −5.7 to −3.5 |
| $C_2Cl_4$ | −22/121 | −20 to 70 | −8.5 to −5.9 |
| Isopentane | −159/28 | −40 to 20 | −3.4 to −2.1 |
| Methanol | −97/65 | −40 to 40 | −7.7 to −5.5 |
| Trimethyl borate | −34/69 | −30 to 40 | −7.5 to −5.5 |
| PFO | −25/105 | −20 to 70 | −5 to −1 |
| DFP | −83/55 | −40 to 40 | −5 to −0.75 |

Table 1 shows that despite the large temperature range the variability in Pneg is relatively modest. This facilitates neutron detection while the detector remains blind to interfering gamma-beta radiation. R-113, and $C_2Cl_4$ are preferred detector fluids because they are both non-flammable and embody Cl atoms which facilitates detection of fast neutrons. R-113 is preferable for detection at room temperature since the Pneg value required is not as high. Tri-methyl borate more readily permits thermal to fast neutron detection but has the drawback that it is flammable.

R-113 is, at present, not readily available and is being phased out. However, replacements (PFO and DFP) have been found to offer superior fast neutron detection performance and can be used up through 70° C. since the boiling point for PFO is about 103° C. It is also non-flammable and nonreactive and is not known to cause health problems. Isopentane and DFP offer the best sensitivity for fast neutron detection and together with acetone also opens up the possibility for combined fast-thermal neutron detection (reaching to about 100% of theoretically maximum intrinsic efficiency). PFO and $C_2Cl_4$ offer operability over the largest temperature range.

Temperature Control in CTMFD Systems

Accurate knowledge of the negative pressure within the detector is dependent on knowing three things, the density of the fluid, the liquid meniscus separation, and the frequency of rotation. The frequency is measured constantly by the speed sensors and can be accounted for quickly and regularly. The density is a known value based on the liquid temperature. Well established correlations may be used which are generally in the form y=mx+c, where, y is the density (g/mL), m is the slope and "c" is the intercept. For example, for PFO, m=−0.0025, c=1.8222. At 17.7° C. the density is 1.784 g/cc, whereas, at 58° C. the density comes down to 1.687 g/mL. Reduced density causes expansion and a reduction of the separation distance "2r" of the meniscus between the two arms. The meniscus separation is based on the initial amount of liquid placed inside the detector and changes from density changes. If the amount of fluid is conserved within the detector, temperature and frequency are the only two parameters that need to be measured to know the negative pressure. Pneg is readily obtained from the relationship (where, ρ is the fluid density, r is the separation distance of the meniscus in the upper arm across the bend to the centerline of rotation, f is the rotational frequency and $p_{amb}$ is the ambient air pressure):

$$Pneg = 2\pi^2 \rho r^2 f^2 - p_{amb}$$

There have been two approaches created to compensate for the changes associated with temperature. Hardware has been setup in the CTMFD to measure the liquid temperature within the bulb. This is accomplished with an infrared temperature sensor placed next to the bulb of the detector. The sensor can be calibrated by creating a meniscus separation vs. temperature correlation. This correlation can be determined by putting the glass detector in a calibrated stable water bath to control the temperature of the detector. At each bath temperature, the detector is given time to come to thermal equilibrium then the meniscus separation is measured.

Once the meniscus separation was measured over the temperature range of interest, the temperature correlation function is created from the data. The correlation is then verified by operating the CTMFD with the infrared sensor measuring the fluid temperature. The system is operated at different ambient air temperatures to change the fluid separation to several values. At several temperatures, the infrared sensor temperature and meniscus separation has been recorded and these values agreed well with the correlation created from a water bath.

The CTMFD speed control software has the meniscus change as a function of temperature programmed in. The infrared sensor monitors the liquid temperature and if a change occurs, the speed is changed to compensate and maintain the same negative pressure.

Figure 19:
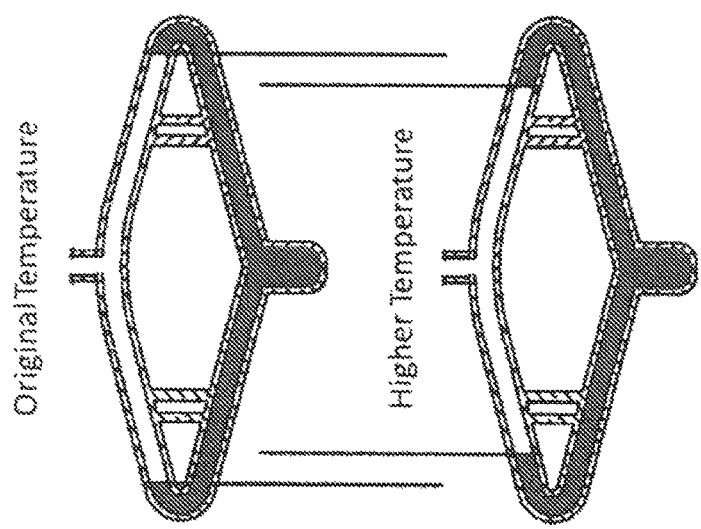
FIG. 19 provides an illustration of a detector having an expansion volume in the upper half of its arms.

An additional approach to compensating for the effect of temperature change is adapting the geometry of the detector. If the size of the tube in the upper arm of the glass detector is sufficiently increased, changes in density will have a smaller effect on the meniscus separation. An example of this concept is shown in FIG. 19. The expansion of liquid is directly related to the size of the expansion bulbs in the upper arms such that the desired reduction in "2r" meniscus separation is attained over the desired temperature range.

This type of geometry allows for a larger change in volume without much change in the linear meniscus separation (r). The meniscus separation can still be calibrated with temperature as with any other geometry but the density will become the dominant factor in determining negative pressure change. This is advantageous because density change as a function of temperature is better understood and simple to correlate.

Motor Control:

Preferably, the motor is controlled by a separate microprocessor. This is because the motor control circuit requires an accurately timed signal of 120 times per second which cannot be carried out in addition to all of the other functions that the master microprocessor performs. The master microprocessor can, when needed, send a value to the motor control microprocessor to indicate the desired speed.

The method used to control the motor power and therefore the motor speed is a high current fast switching transistor circuit. The circuit controls the power to the motor by truncating part of the waveform from the AC power. Therefore the RMS amplitude of the electrical power from the wall socket is not altered but instead is part of the phase that is cut off. In order to do this in a controlled fashion, two steps are needed. First, every time that the voltage from the AC power crosses zero volts, the power is cut from the motor. In addition to cutting the power, a signal is sent to the motor control microprocessor to start a delay timer. After the specified delay period, the motor control microprocessor sends a signal to turn the power back on. This process is performed 120 times per second. The waveform truncation process is illustrated in FIG. 20.

Figure 20:
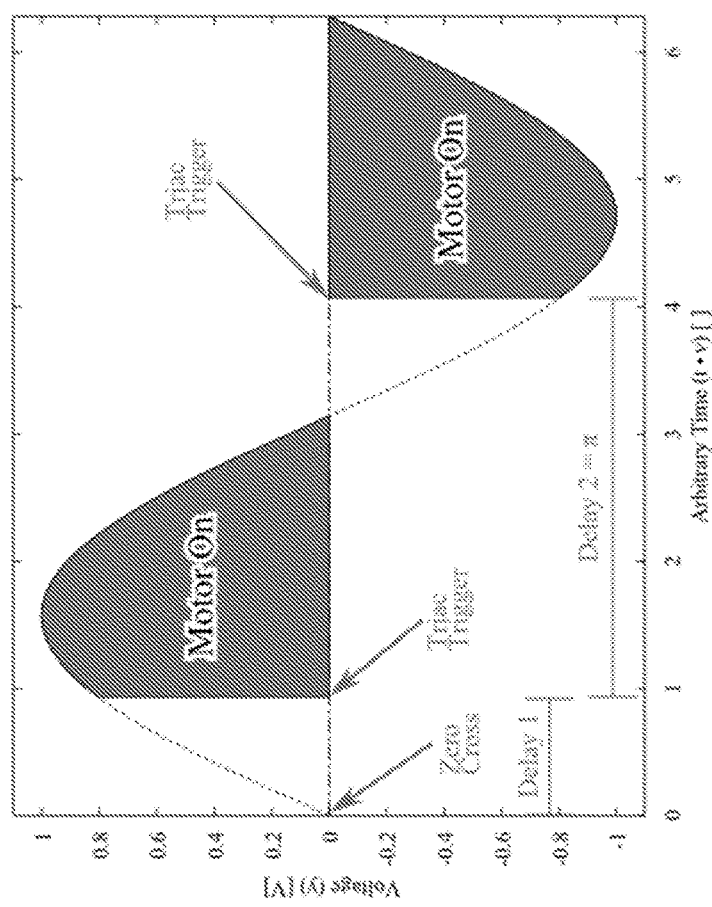
FIG. 20 provides a graphical representation of the waveform truncation used to drive the motor.

In FIG. 20 the delay period between the zero cross and the Triac trigger correlates to the speed of the motor. In the software of the motor control microprocessor, this delay is represented by an integer value ranging from 0 to 255, with a delay of 0 being full power and 255 being zero power.

Acceleration Process:

When accelerating the motor, the motor control microprocessor will receive a command from the master microprocessor giving it the delay value between 0 and 255. (the range can be different between microprocessors). While stopped the delay is set to 255 so accelerating the motor involves lowering the delay. The delay is changed in several steps. This is done because it has been observed that at high negative pressures approaching −10 bar and below, turning the motor an too quickly can cause a jerky start and is more likely to cause spontaneous cavitation or imbalance leading to suction of air from outside both of which is not caused by radiation interaction. If the motor is turned on to full power immediately, the detector receives a powerful jerk and yet it still takes roughly 2 seconds for the motor to reach full speed. Surprisingly, when the motor is accelerated in steps in a more controlled fashion over roughly 4 seconds the amount of spontaneous cavitation (false positive events) observed is greatly reduced. The steps of accelerations are:

To begin, the delay is immediately lowered to 195 because above 195 the motor does not have enough power to overcome friction.

A 100 ms delay while the motor begins to turn.

Loop to reach final delay value

If the difference between the current and final delay is greater than 50, change by 25. Then delay 50 ms.

If the difference between the current and final delay is greater than 10, change by 5. Then delay 25 ms.

If the difference between the current and final delay is less than 10, change by 1. Then Delay 25 ms.

Final delay value is reached.

This process takes a little more time than turning the motor on to full power immediately but has shown much greater reliability when using the detector.

The deceleration process is the exact opposite. For slowing down, the existence of false positives is not a consideration but it has been observed that slowing down the motor gradually puts less stress on the motor and detector. Thus, it is preferred but not necessary to slow the motor gradually.

Speed Calibration and Correction Process:

It has been determined that using an active feedback measurement of the speed during the acceleration process increases the acceleration time considerably and makes measurements with short wait time difficult. Previously active measurement was used in conjunction with a calibration because the calibration was not reliable. Improvements have been made in the calibration method to allow the removal of active speed measurement from the acceleration process.

The effect of changing the delay period in the motor control microprocessor has a quadratic effect on the speed. The software on the Master microprocessor includes a calibration function which if used regularly makes the acceleration process more reliable. The calibration is performed by running the motor at a plurality of delay values such as 3, 4, 5, 6, 7, 8, 9, 10 or more for 5 seconds each to make sure the motor speed is stable and then measuring the speed. These live delay and speed values are used to perform a quadratic curve fit. It is important to note that the curve fit is performed on the Master microprocessor which has less arithmetic precision than a typical computer. As a result of this, a quadratic curve fit alone results in a large amount of rounding error which makes the calibration inaccurate. To alleviate this problem, the data is centered about the median value which eliminates the rounding error issue.

This calibration process is automatic and takes about 1 min and can be performed by the GUI. After the detector speed is calibrated, the calibration is used to tell the motor control microprocessor what delay value to use. The calibration has been shown to be sufficiently effective at choosing the correct speed that active speed correction does not start until 1 second after the motor has been set to its final delay setting. This is to say that the speed is measured and displayed during the entire acceleration process but the master microprocessor waits until 1 second after the motor control circuit reaches its final state before making any correction.

The motor unfortunately cannot be run on calibration alone. Over time, a period minutes, the motor begins to heat up which slightly changes the power consumption of the motor and slightly alters the calibration. As a result of this some small active speed correction is required. This can be done in two ways. First, after the motor is up to speed, the speed is monitored several times per second and if the negative pressure differs by more than 0.1 bars from the desired value, the speed is adjusted. Additionally, to account for long term operating effects, a correction factor is added to the calibration. While the motor is operating, if the motor is operating at the correct speed and the required delay is different than that of the calibration, the calibration is slightly altered by a linear factor to account for the motor's current condition. This means that in between runs the controller essentially keeps track of the last setting which resulted in the correct speed. Whenever the motor is recalibrated or the negative pressure is changed, this correction factor is set back to zero. Whenever the correction factor is returned to zero, one acceleration of the motor is done without collecting data to verify the calibration.

Performing this process has meant that the motor can be accelerated reliably minimizing false positive detection while accelerating quickly enough to detect the radiation with a waiting time of only a few seconds.

MAC-TMFD:

Aforementioned CTMFD configurations involve a single centrally positioned sensitive detection volume in a bulb. If a detection event takes place, the CTMFD must be stopped, the gas bubble allowed to escape, and then re-started precluding continuous operation. For any given speed, density and meniscus separation, a single Pneg state is available for detection.

A novel multi-arm CTMFD (MAC-TMFD) system has been developed that can operate continuously In addition, the CTMFD can be configured such that not one but a collection of plurality of different TMFD detection fluids can be used in a plurality of separate detection arms for example 2, 3, 4, 5, 6, 7, 8, 9, or 10 or more. Each arm can have a fluid with distinct Pneg requirement for detecting the specific energy of a given nuclear particles (alpha, neutrons, fission). This provides for simultaneous detection of different energies of incoming or dissolved nuclear particles. With a single start-stop operation, multiple data points can be obtained. The design of an arm for such a device is shown in FIG. 23.

Figure 23:
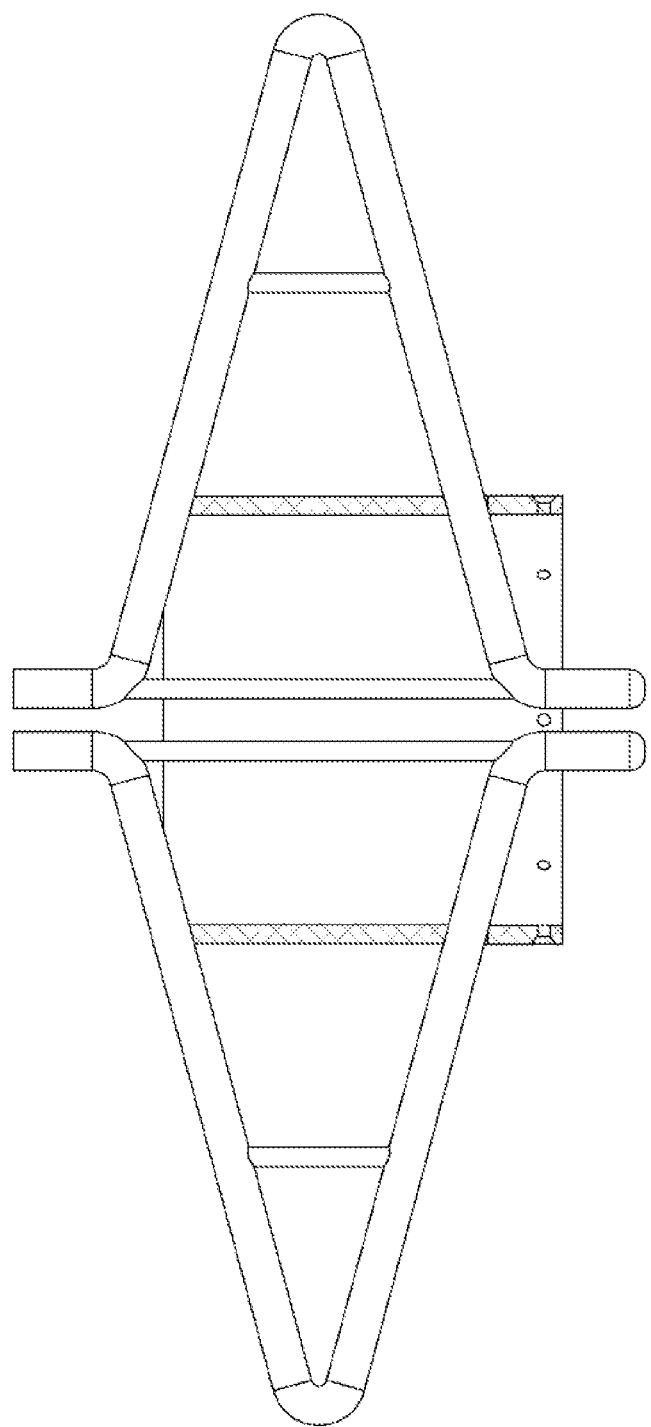
FIG. 23 provides a diagram of the structure of a MAC-CTMFD having a plurality of detector arms containing distinct detection fluids. The structure of one arm is shown.

As shown in FIG. 23 the device can have a single glass tube with variable volumes along its length to accommodate higher volumes in the highest Pneg sensitive region. The tubes are arranged symmetrically around the centerline of the detector. The tubes can be attached to one another by a holder. The device can have a self-powered wireless transmitting IR beam-receiver affixed to each sub-unit's sensitive zone and the central holder can be attached to a drive motor which can be controlled in speed as for conventional TMFD. All of this configured as in conventional CTMFD as well as in a self-contained centrifuge type enclosure into which individual detector sub-units of the CTMFD detector can be interchanged.

Detection efficiency for alphas and neutrons require lesser Pneg than that for conventional CTMFD. Efficiency of detection varies directly with sensitive volume of each sub-unit therefore, each tube must be calibrated when sub-units vary in size. The design makes detection in each tube independent from detection in other tubes of system. Intervening glass and structural material used in the construction of the device can be used that is sufficient to dampen shocks produced during detection. Wireless bubble cavitation detection permits identifying the time and pertinent detector tube in the MAC-TMFD which can be transferred to the external user interface (manual/automated).

The MAC-CTMFD detector system provides for simultaneous detection at multiple Pneg values at a single drive speed through the use of distinct fluids based on its density, and/or meniscus separation distance "r" from the centerline. It can also provide alpha/neutron spectrometry with detection rates at various Pneg values and/or use of different types of liquids in individual sub-units, each with its own unique detection sensitivity to neutron/alpha energies for a given Pneg; significant reduction in dead time between detection events compared with conventional CTMFD. Tables 3 and 4 show that the MAC-CTMFD can discriminate between spontaneous fission $^{252}$Cf and randon $(\alpha,n)$ type (Pu—Be) source neutron spectra using either isopentane or trimethyl borate. The last column clearly depicts the ratio of count rates at 3 different Pneg values. For example, from Table 3 we see that the ratio of counts from Cf to Pu—Be sources at just 3 different Pneg values of −2.75 bar, −2.60 bar and −1.65 bar are dramatically different: 1:0.92:1.4 when using isopentane. If trimethyl borate were to be used, the relative ratios are different at 1:1:2.7. This aspect is further obvious from FIG. 5. Also, alpha recoil based detection of dissolved SNMs like $^{241}$Am, $^{239}$Pu can be more readily attained using the MAC-TMFD concept.

TABLE 3

Source discrimination in MAC-TMFD with detection fluid isopentane

| Negative Pressure | Cf-252 Wait Time | Pu-Be Wait Time | Cf Pu-Be Ratio (normalized) |
|---|---|---|---|
| 2.75 | 3.63 ± 0.60 | 6.94 ± 1.06 | 1 |
| 2.60 | 4.56 ± 0.77 | 9.45 ± 1.55 | 0.924 ± 0.16 |
| 1.65 | 27.65 ± 3.76 | 35.83 ± 5.46 | 1.476 ± 0.20 |

TABLE 4

Source discrimination in MAC-TMFD with detection fluid mixture 90% trimethyl borate, 10% methanol

| Negative Pressure | Cf-252 Wait Time | Pu-Be Wait Time | Cf Pu-Be Ratio (normalized) |
|---|---|---|---|
| 6.00 | 6.28 ± 0.98 | 11.01 ± 1.70 | 1 |
| 5.75 | 6.95 ± 1.07 | 12.09 ± 1.71 | 1.007 ± 0.21 |
| 4.40 | 65.13 ± 11.01 | 42.30 ± 6.04 | 2.697 ± 0.35 |

Hand Portable CTMFD:

The embodiment of a lightweight (3-4 lb) hand portable CTMFD (HP-CTMFD) which is Arduino type programmed panel for control and data acquisition and display of detection data and also battery powered is based in large part on the hardware description and control logic discussed above. The key differences involve using lighter weight materials and substituting DC-based electrical circuitry for driving the. A transparent safety enclosure can be present with holes drilled in the base sized together with a PC type fan mounted onto the drive shaft to allow for air flow and thermal management. In an embodiment of the HP-CTMFD (while using R-113 provides detection of eV energy neutrons from energetic boosts with (n,p) reactions in $^{35}Cl$ enables detection of neutrons from SNM sources such as $^{252}Cf$ and Pu that are either bare or shielded with paraffin type neutron moderators.

A version of the CTMFD has been created weighing about 3-4 lb compared with about 25 lb for the SNOOPY® detector neutron dosimeter. The CTMFD is battery powered and permits virtually all of the functionality of the tabletop CTMFD. In addition to it having its own power source and lesser weight, the output of the unit can be to the instrument's display panel as opposed to a PC although, a wireless mode can also be implemented by following the method logy for the MAC-TMFD. In addition, the speed control mechanism is simpler and considerably more compact being 1"×0.5" chip based versus about 4"×3" for the tabletop version. The handheld version also required a different calibration mechanism since it is battery powered based on the fact that every battery is different even of the same make and the fact that battery performance changes with time. An active temperature sensor-based control can also be included in a similar manner to that for the tabletop version for active compensation of temperature changes to adjust the drive frequency to maintain the desired Pneg value. This version has much more compact hardware and is powered by batteries. These aspects are discussed next.

The primary inputs from the user menu permits entry for TMFD fluid density, the fluid meniscus separation distance, the desired Pneg level, the calibration constant to convert detection rate to neutron dose, the number of start-stop detection events, manual or automated operation (i.e., if in manual mode the bubble detection sensor can be turned off). Much of the hardware that makes up this version is similar to the table top device so a brief description of the hardware will be given and discussion of the aspects that are significantly different from the table top CTMFD version. A diagram of the hand portable CTMFD (HP-CTMFD) is shown in FIG. 21.

Figure 21:
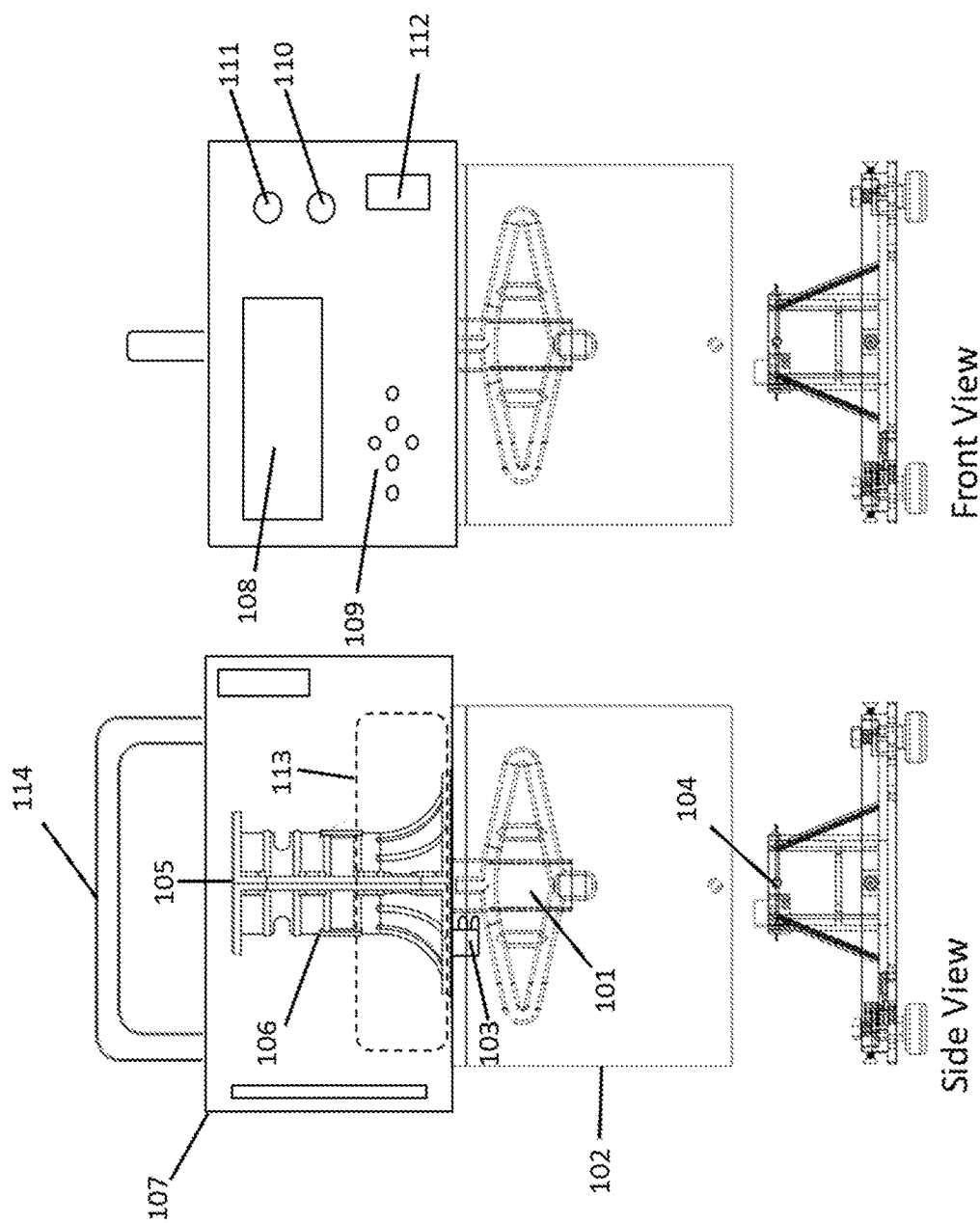
FIG. 21 provides diagram of the basic hardware features of a hand portable CTMFD device.

Numeral 101 in FIG. 21 references the entire detector assembly which is a handheld version very similar to the table top version. The only differences are the size and the threaded connector which is tapped for a different motor. The size of the glassware and the holder are smaller than the table top device to increase portability.

Numeral 102 in FIG. 21 references a safety enclosure. This transparent enclosure protects the user in case of detector fracture. This is similar to the table top CTMFD but smaller.

Numeral 103 in FIG. 21 refers to a reflective speed sensor. This sensor sticks in from the side of the safety enclosure to sit close to the top of the holder. The sensor is a reflective speed sensor like the one in the table top device but is slightly smaller. The speed sensor on the handheld CTMFD operates in the same way as it does on the table top CTMFD.

Numeral 104 in FIG. 21 refers to a bubble sensor. A small frame holds the small transmission sensor that detects the presence of the bubble from detection. This sensor holder is attached to the bottom of the safety enclosure which is removable to allow changing the detector assembly. The bubble sensor on the handheld CTMFD operates in the same way as in the table top CTMFD.

Numeral 105 in FIG. 21 refers to the motor. The motor used in the hand-portable CTMFD is a compact high speed DC motor typical of that used in rotary tools such as Dremel tools. One of the primary differences between the table top and HP-CTMFD is the motor. A DC motor is advantageous for a handheld device because batteries provide untethered DC electrical power.

Numeral 106 in FIG. 21 refers to a motor holder. The motor can be held in place and connected to the other components by a custom 3D printed motor holder. This holder can be custom formed to the contours of the motor to hold it tightly and also holds the motor shaft bearing to maintain alignment of the axis of rotation. Diagrams of the inside of the motor holder and the holder with the motor in it are shown below. 3D printing facilitates low-cost and lightweight construction (e.g., SLA plastic or some other version such as PLA). The curved ribbed vanes shown on the holder minimize material and provide for structural strength as well as fin area for thermal management. The number of ribbed vanes can be varied to accommodate the drive shaft. The inside diameter is chosen to snugly fit with foam insert to enable minimal vibration during operation to levels comparable to that for a Dremel type rotary tools which are optimized for the motor types employed for high speed (e.g., to 30,000 rpm) rotation. The motor holder is made up of two halves that sandwich the motor like a shell and are held together with removable hardware. The motor holder holds the motor in place and also has ventilation holes in the same location as the motor.

Numeral 107 in FIG. 21 refers to a control box. On top of the motor holder is the control and display hardware. A small enclosure holds the control microprocessor, display screen, batteries, user control hardware, and motor control hardware.

Numeral 108 in FIG. 21 refers to a display screen. The handheld detector features a display screen which allows the user to navigate the menus to setup the detector and displays relevant information while the detector is operating. The display screen is the mechanism that provides for information display on the detector. The display screen can be used to show the detector timers and current measurement while the motor is operating and can be used to display menu options while the motor is stopped. Although the handheld detector can also be configured with a mechanism for outputting results in a digital form.

Numeral 109 in FIG. 21 refers to buttons. The control box features several buttons for the user to control basic functions and access the device menu. The user buttons under the display screen allow the user quick access to basic functions of the detector. All of the functions of the user buttons can be performed by the remote control but the buttons serve as a redundant backup option for the most common functions and allows the detector to be operated if the remote is lost or stops working.

Numeral 1010 in FIG. 21 refers to a remote sensor. This is the sensor for the handheld detector's remote control. The handheld detector features a remote control that simplifies the hardware while allowing a variety of user commands and a number pad allowing number values in the software to be changed. The remote control sensor receives the wireless signal from the remote control and sends it to the microprocessor to be decoded. The remote control allows for a large variety of commands to be sent. This allows diverse user input without a large number of buttons.

Numeral 1011 in FIG. 21 refers to a stop button. The control box features a button which will slow the motor independently of the other software functions. This acts a backup method for slowing the motor that is hardware based and reacts faster than the software based mechanisms for slowing the motor. The stop button is a backup slowing mechanism for safety and convenience. The motor can be slowed either by the remote control or the user buttons but the stop button is quicker and easier to use. The other stopping mechanisms for the motor are software based and may not respond immediately if the software is in the middle of performing some other function. Pressing the stop button slows the motor through hardware and will respond immediately. It can also be a larger brightly colored button for convenience.

Numeral 1012 in FIG. 21 refers to a power switch. This switch controls the power to the microprocessor and display. Since the handheld detector has a battery to power the motor, which often needs to be changed, the control microprocessor and display are powered by an additional internal battery which is controlled by this switch. The internal battery and power switch provide power for the microprocessor and display screen. This second battery allows the motor battery to be changed without affecting the software and display functionality.

Numeral 1013 in FIG. 21 refers to a battery. A compact high current lithium-ion battery is used to power the motor of the hand held CTMFD. The battery latches into the control box but is easily removable so the detector can continue to operate on a different battery while charging occurs. The motor battery can also be used to power the sensors. This is done because the sensors would cause the internal battery to drain too quickly and the sensors only need power when the motor is operating anyway. Power is provided to the sensors through a voltage regulator since the motor battery is at a higher voltage than the sensors can use.

Numeral 1014 in FIG. 21 refers to the handle. A handle attached to the back of the control box allows the user the carry the detector easily.

Unlike the tabletop CTMFD, the handheld CTMFD can be controlled by a single microprocessor. The motor is controlled by a PWM signal, described in more detail above, and a motor power circuit. The motor power circuit draws power from the motor battery and delivers it to the motor based on the signal from the microprocessor.

Power Delivery

Figure 22:
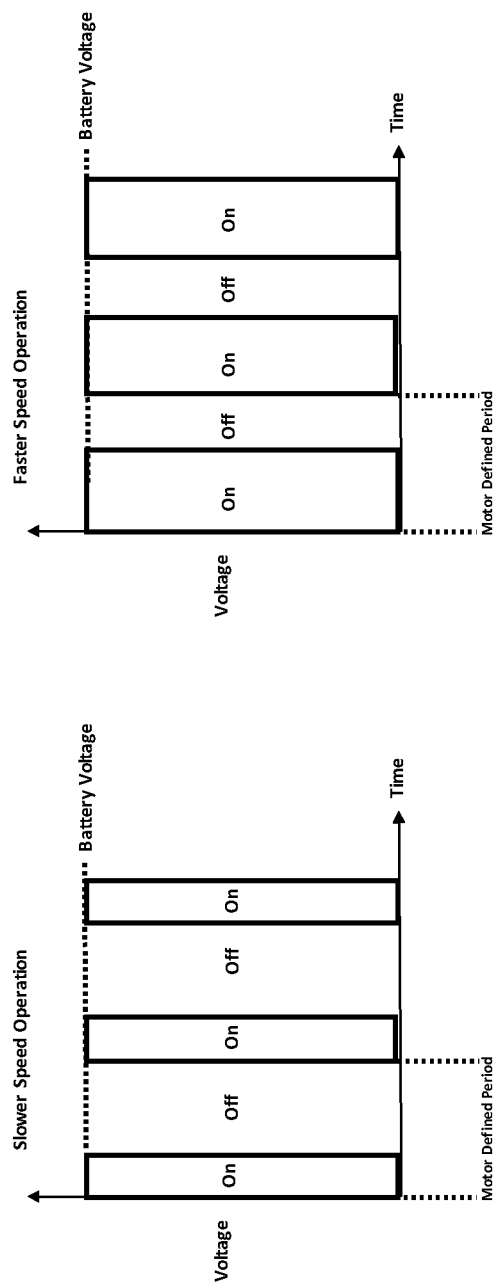
FIG. 22 provides a schematic of Pulse Width Modulation of motor speed in a hand held CTMFD.

The motor in the hand held detector is a DC motor. The control mechanism for the motor is relies upon Pulse Width Modulation (PWM), instead of controlling the voltage of the power supplied to the motor the power is pulsed at full voltage. The frequency of the pulsing is determined by the design of the motor. The motor used in the hand held detector can have its own preferred pulsing frequency so the microprocessor is setup to pulse at that frequency. Since the motor is powered in pulses the width of the pulses will control the power delivered. Wider pulses will result in a higher speed. The pulsing concept for controlling the motor is demonstrated in FIG. 22.

The PWM control signal can be generated and continuously emitted from the control microprocessor. It has the ability to do this in parallel with the other software functions. The PWM signal is then delivered to the motor power control circuit which basically consists of digitally controlled high speed solid state switches that can provide several amps of current and switch on the amperage for a few microseconds. This motor power circuit draws power from the motor battery to run the motor.

Speed Control for HP-CTMFD

The microprocessor uses a calibration to determine the pulse width needed to achieve the desired speed. Since the motor is battery powered, the motor cannot be controlled by a prior single point calibration alone and preferably to be reset each time to accommodate possible reductions in battery performance. A two-step approach is recommended to avoid overshoot. For example, using the Li-ion battery of type commonly used in 4A type Dremel tool, for the HH-CTMFD (using R-113 as the detection fluid, the motor is accelerated linearly over about 2 seconds to about 90% of the calibrated final speed. Degassing is done similarly to that for the TI-CTMFD using known techniques such as filtering, acoustic, or vacuum pressure. At this point, the speed sensor starts providing active feedback for the remainder of the acceleration process. By doing this, the motor will not overshoot (beyond $\frac{1}{10}$th of bar of Pneg) the desired negative pressure which may then provide for a less accurate detection for nuclear radiation. If the motor is slightly under powered due to the battery being drained the speed can also be corrected.

Speed Calibration for HP-CTMFD:

The HP-CTMFD as constructed features an automatic calibration function for the relationship between the duty cycle of the PWM signal and resultant speed of rotation. This function is useful because the various batteries used in the detector have different feedback and provide differing power as they become drained. The calibration sets the motor at several pulse widths and measures the speed at each. The results are then put through a linear least squares algorithm to determine a linear calibration. This automatic calibration is generally used every time the battery is changed.

Figure 15:
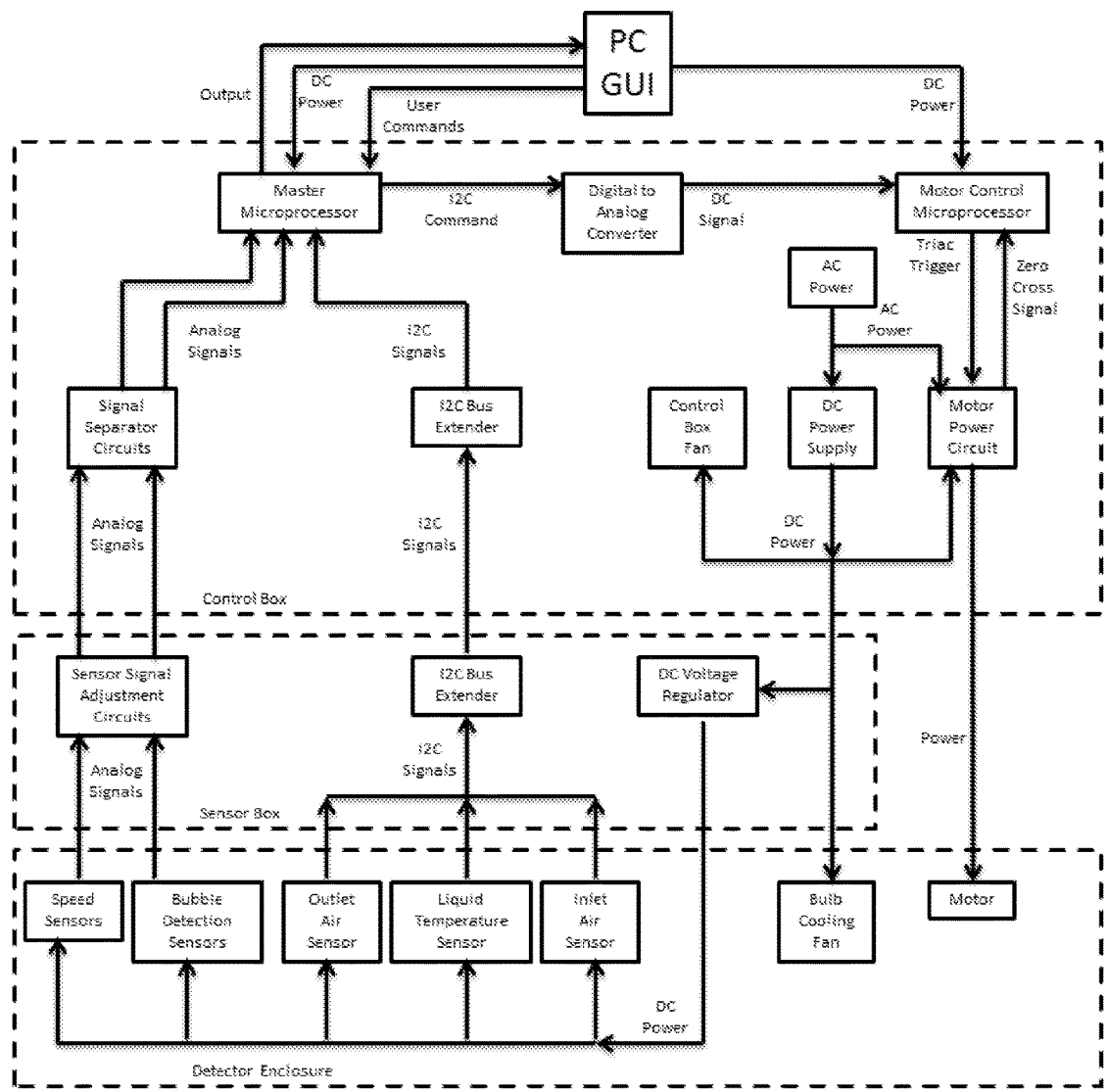
FIG. 15 provides an overview of an embodiment of the basic electronics for hardware operation of a CTMFD system.

The electronic operation of the CTMFD can be better understood with reference to FIG. 15 and the description below. The primary functions and automation of the detector is controlled by a master microprocessor, that determines the operating speed of the motor, performs detector rotation speed measurement and negative pressure calculation, does the timing and detection rate calculation, measures the light transmission from the bubble sensor to determine when detection has occurred, and accepts the temperature measurements to determine when compensation is needed to maintain the desired negative pressure.

When operating in manual mode, a graphical user interface (GUI) on a computer is used to command the detector to operate at a certain negative pressure. Upon receiving the start command from the GUI, the Master microprocessor determines the required speed from calibration functions and sends a command to the digital to analog converter (DAC). The DAC then outputs a DC voltage correlating to a desired speed. The Motor Control Microprocessor then measures the voltage from the DAC and demines how to control the motor.

A Motor Control Microprocessor then determines the needed trigger times for the Triac circuit and sends them at the proper time after receiving the signal from the zero cross circuit.

A motor power circuit provides the power to the motor.

While the motor is operating, the speed sensor provides feedback to the master microprocessor. If the speed measured does not match the desired speed, adjustment is made.

While the motor is operating, the master microprocessor is also frequently measuring the signal from the bubble sensor. When a large change in transmission occurs in the bulb of the detector, the Master microprocessor recognizes the formation of the bubble and records the event in memory.

The liquid temperature sensor frequently reports the liquid temperature to the Master microprocessor. If during operation the temperature of the fluid changes, the speed required for the desired negative pressure is altered to compensate.

The Master microprocessor frequently communicates relevant information to the GUI so the user can monitor the progress of the measurement. The GUI is also used to record and save the measurement results because of the limited memory on the Master microprocessor.

The detector can operate in a fully automated mode that does not require user commands. In this case the GUI is just used for display and data recording.

The Control box also contains the power supply which provides power to the sensors and fans.

Figure 16:
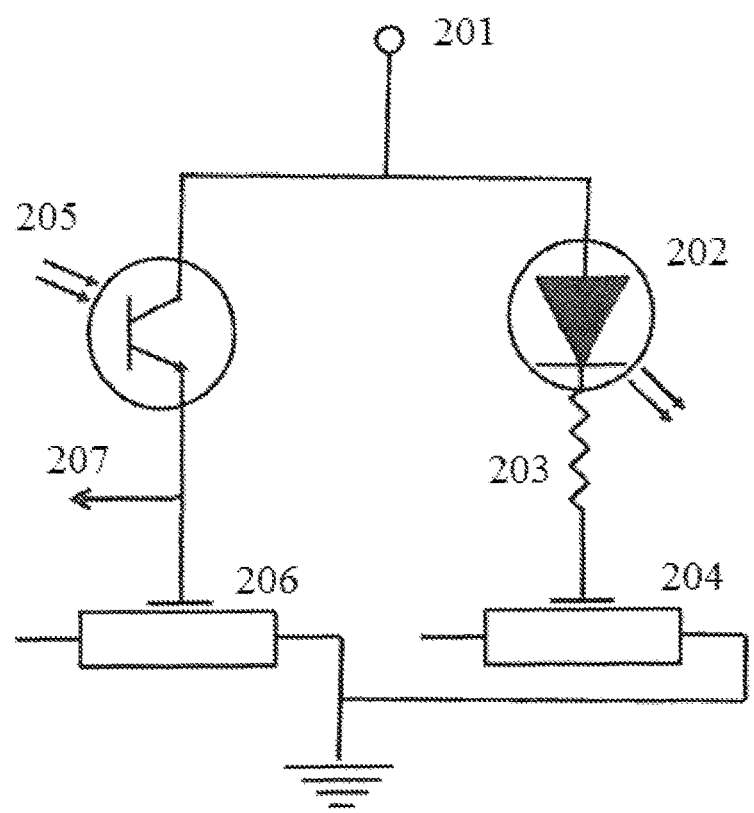
FIG. 16 provides a schematic of the basic IR sensor detection scheme.

The basic infrared sensor scheme can be better understood with reference to the FIG. 16 and the following description.

Numeral 201 in FIG. 16 refers to input voltage which is used to generate light in the emitter and allow current to flow through detector.

Numeral 202 in FIG. 16 refers to an LED emitter which is used for the light emitter for both the bubble and speed sensors.

Numeral 203 in FIG. 16 refers to a power limiting resistor that prevents the LED from overdrawing current and burning out. A value of roughly 50-100 ohms can be used depending on the LED.

Numeral 204 in FIG. 16 refers to a power adjustment potentiometer that allows for adjustment of the light generated by the LED. Generally a potentiometer with maximum resistance of roughly 100 ohms will be sufficient.

Numeral 205 in FIG. 16 refers to a phototransistor that is used as the detector for the bubble and speed sensors. In the case of the bubble sensor, the detector is placed across the bulb from the emitter and transmission is measured. For the speed sensor, the emitter and detector are placed next to each other and reflective material on the spinning detector is used to reflect light back into the sensor and measure the frequency of rotation.

Numeral 206 in FIG. 16 refers to a signal adjustment potentiometer that adjusts the shape and amplitude of the detector signal to allow for easier measurement by the microprocessor. Generally a potentiometer with maximum resistance of roughly 10 k ohms is used.

Numeral 207 in FIG. 16 refers to an output signal that is measured by the microprocessor to determine either the speed of the motor or the presence of a bubble.

A custom printed circuit board (PCB) provides electrical power to the various sensors on the CTMFD, provides electrical connections for the analog signals coming from the sensors and conditions the sensor signals before sending them back to the main control board. Housed on the sensor PCB are connections for the two bubble detection sensors, 2 speed sensors, bulb cooling fan, infrared bulb temperature sensor, inlet air temperature sensor, and outlet air temperature sensor. The components of PCB can be better understood with reference to FIG. 17 and the description below.

Figure 17:
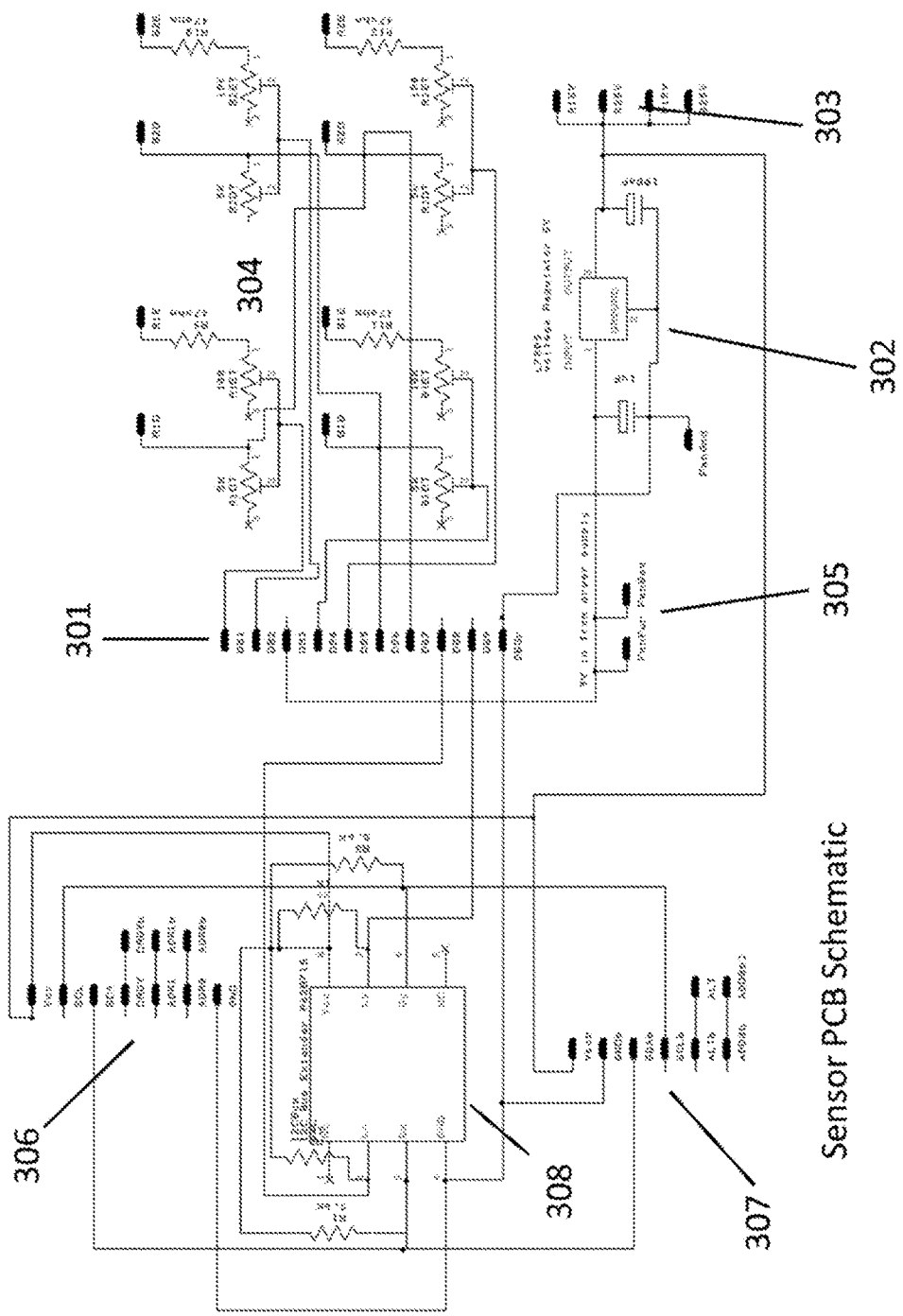
FIG. 17 provides a schematic illustration of an embodiment of printed circuit board for use providing power to the components of the present invention.

Numeral 301 in FIG. 17 refers to a 9 pin connector that connects to the signal cable. Power, ground, and all signals are sent through this connector.

Numeral 302 in FIG. 17 refers to a voltage regulator that provides the correct DC voltage needed to operate the various sensors. A higher voltage is needed to power the cooling fan than the sensors and the regulator accommodates both voltages.

Numeral 303 in FIG. 17 refers to the bubble and speed sensor power connector that provide electrical power to the bubble detection sensors and speed sensors.

Numeral 304 in FIG. 17 refers to the bubble and speed sensor signal connectors that receive the signals from the bubble and speed sensors. The signals are then adjusted in shape and amplitude with resistors before sending them to the control board. After the signals are adjusted, the two and bubble signals and separately the two speed signals can be combined to reduce the number of wires needed on the sensor cable.

Numeral 305 in FIG. 17 refers to the cooling fan connectors that provide power to the cooling fan and works to stabilize the detector temperature.

Numeral 306 in FIG. 17 refers to the liquid and input air temperature sensor contact which are housed on the same PCB next to the detector bulb. This connector provides electrical power to the temperature sensor PCB and receives the 12C signals back from the PCB.

Numeral 307 in FIG. 17 refers to the outlet temperature sensor that provides power and receives the 12C signals from the outlet air temperature.

Numeral 308 in FIG. 17 refers to the 12C bus extender which provides signal conditioning and impedance matching required to allow the 12C signals to be sent over a long cable and received correctly by the control PCB.

A PCB houses the microprocessor controller connectors, sensor connectors and power control, motor power control, and 12C sensor receiver. There are two microprocessor boards used for control and data collection that connect to this PCB. Additionally there is a digital to analog converter PCB used in motor control which also connects to the control PCB. This PCB and its operation can be better understood by reference to FIG. 18 and the description below.

Figure 18:
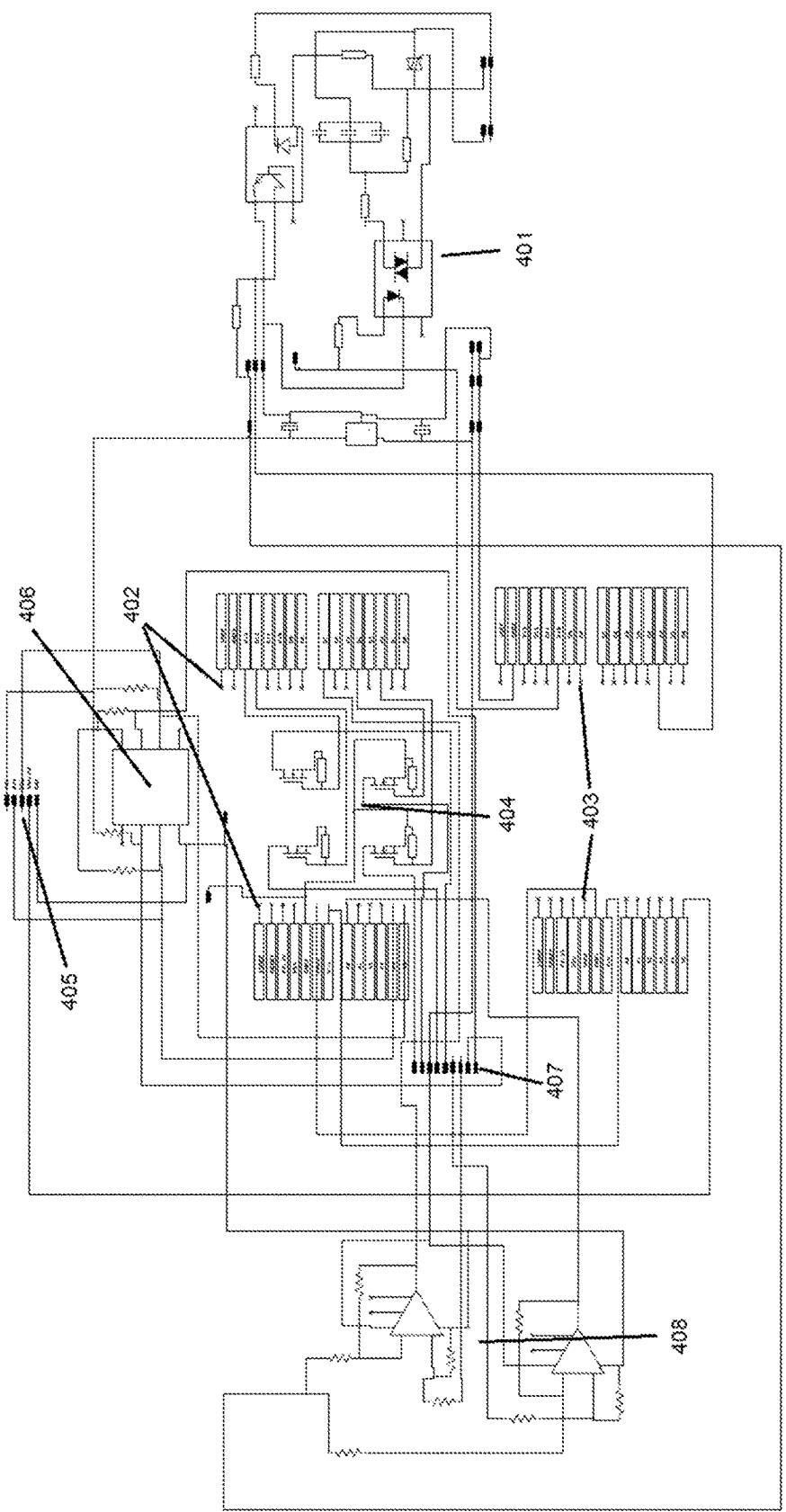
FIG. 18 provides a schematic diagram of a control PCB board.

Numeral 401 in FIG. 18 refers to a motor power circuit that takes the AC power from the wall outlet and removed part of the wave to control the power delivered to the motor. A signal received from the motor control microprocessor tells this circuit when to turn on and off thereby controlling the motor speed.

Numeral 402 in FIG. 18 refers to a master microprocessor connector that holds the master microprocessor PCB in place and makes the needed electrical connections for signal input and control signal output.

Numeral 403 in FIG. 18 refers to a motor control microprocessor connector that holds the motor control microprocessor PCB in place as well as making the connections needed to receive the speed control signal from the Master controller board and the output signal sent to the motor control circuit.

Numeral 404 in FIG. 18 refers to bubble and speed sensor power switches. These digitally controlled switch circuits use mosfets to turn the power on and off to the bubble and speed sensors. Since the bubble and speed sensors are crucial components for detector operation, there is an extra redundant sensor for each. To extend the lifetime of the components and prevent interference between the two sets of sensors, these digital switches, preferably, turn the power on only to the sensors that are currently being used.

Numeral 405 of FIG. 18 refers to the DAC connector used for the digital to analog converter (DAC) PCB. This PCB receives a digital command from the master microprocessor to set the motor speed. The DAC then generates an analog DC voltage that the motor control microprocessor receives and coverts to the motor control signal.

Numeral 406 in FIG. 18 refers to a 12C bus extender. This is the second of the two required signal conditioning ICs needed to send the 12C signal over several feet of signal wire. This second 12C Bus extender receives the 12C signal from the first located on the Sensor PCB and then sends it to the Master microprocessor for decoding.

Numeral 407 in FIG. 18 refers to a 9 pin connector for the signal cable. This connector matches the one on the Sensor PCB and provides the needed connections to provide power to the sensors and receive the sensor signals.

Numeral 408 in FIG. 18 refers to bubble and speed sensor voltage subtractor circuits. These circuits take the bubble and speed sensor signals, which consist of a combination of the two sensor signals, and separates the signal from the sensor that is currently turned on to be sent to the master microprocessor.

Example 1

Example 1 demonstrates: CTMFD detection using PFO for neutron detection and gamma-blind neutron dosimetry. The CTMFD was used to detect a spontaneous fission source ($^{252}$Cf) and to compare its performance against an industry standard neutron monitor known as SNOOPY®. The CTMFD's sensitive volume bulb sine was about 4 mL.

Figure 5:
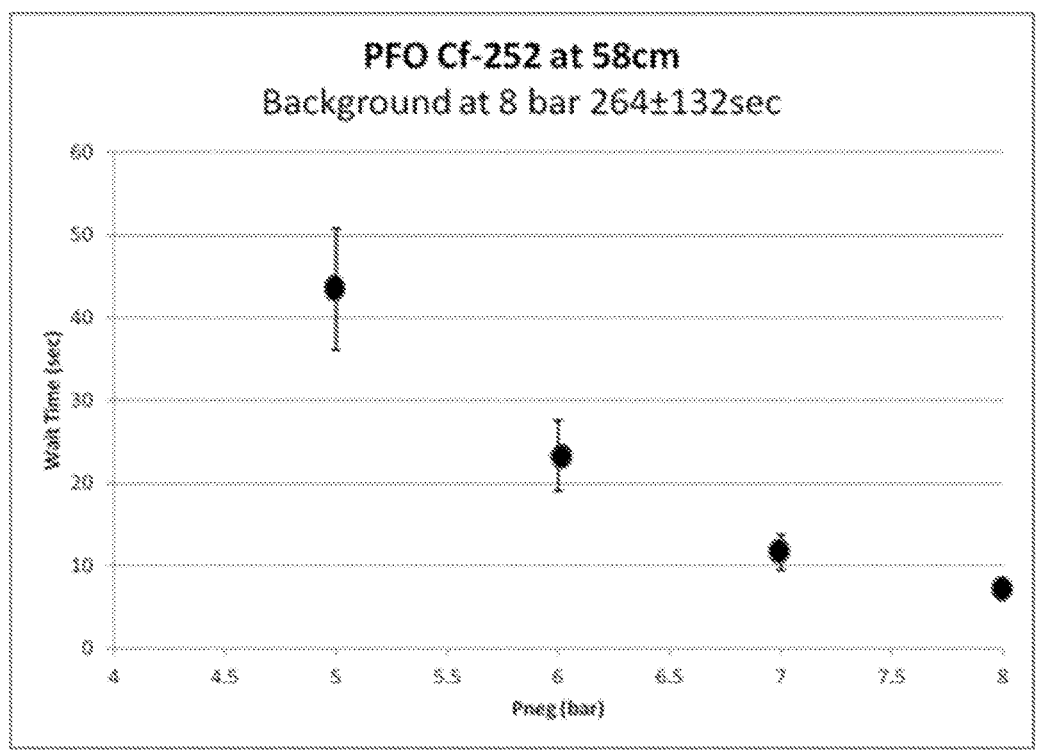
FIG. 5 provides a graph of wait time versus Pneg for $^{252}$Cf detection by a CTMFD detector using PFO as the detector fluid.

Detection of $^{252}$Cf using acetone and PFO was compared with the SNOOPY®. At the same Pneg state (e.g., –8 bar), the use of PFO vs acetone enables 100% improvement in detection efficiency. To avail of the same type of detection efficiency as with PFO (at –8 bar) required a Pneg of about –10 bar for acetone. The CTMFD (4 mL sensitive volume) performance using PFO as the sensing fluid is shown in FIG. 5.

The fluid in the CTMFD detector was thoroughly degassed using known techniques.

Figure 6:
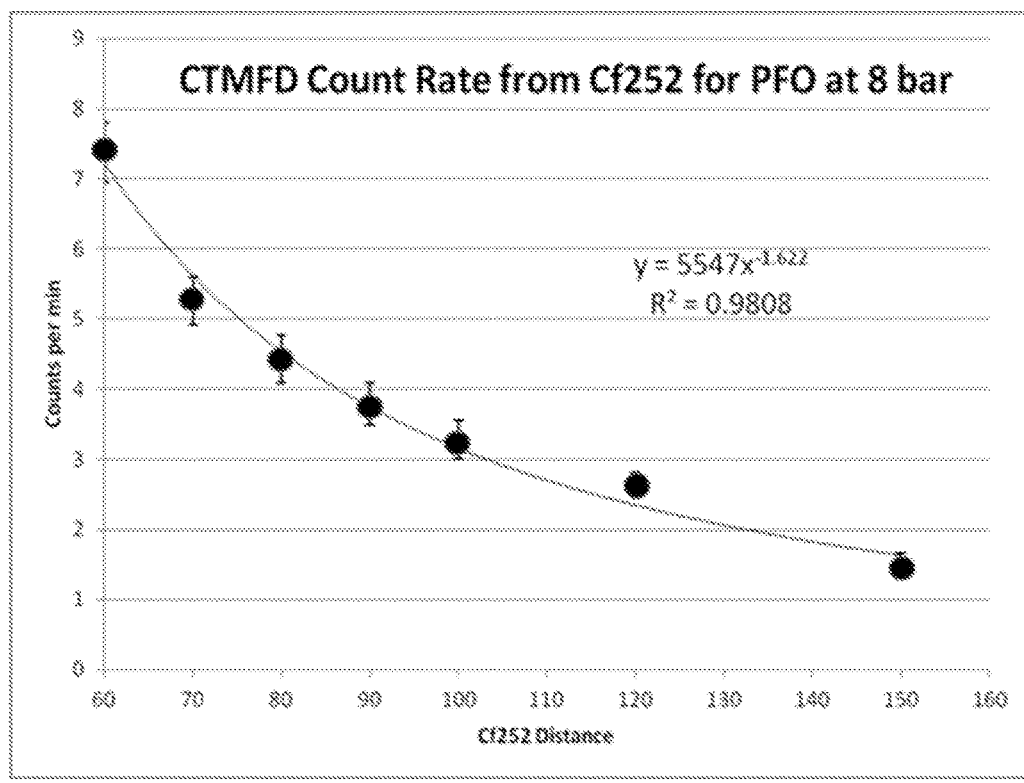
FIG. 6 provides a graph of counts pre minutes versus distance from a $^{252}$Cf radiation source using a CTMFD detector with PFO as the detector fluid at −8 bar of pressure.

The CTMFD can be used as a neutron dosimeter that is also simultaneously blind to gamma photons unlike state-of-art neutron dosimeters based on $BF_3$ or He-3 which are not. By deriving a count rate vs distance plot for the CTMFD and correlating it with the calibrated dose rate versus distance from the SNOOPY®, a cpm to dose rate conversion constant can be derived and introduced into the CTMFD control-analysis software to then dynamically convert the cpm readings of the CTMFD to dose rate information as shown in FIG. 6.

A summary of the comparison of the CTMFD detector with SNOOPY® is shown below.

| Detector | Neutron Detection Efficiency (counts/mrem/cc) |
|---|---|
| Superheated drop detector (55 cc from BTI) | 0.005 to 0.55 |
| BF3 (~80 cc pressurized) HDPE moderated Snoopy | 90 |
| CTMFD (4 cc. PFO at –8 bar) | 411 |

The CTMFD sensor using PFO as the sensing fluid at Pneg=–8 bar, offers surprisingly superior performance enablement for neutron detection of about 4.7 times [(7.4/4)/(33/80)]. The neutron dose reading from the SNOOPY® is also captured within +/–10% error. For example, at 60 cm from the $^{252}$Cf source emitting about $10^5$ n/s the SNOOPY® reading was 025 mRem/h versus about 0.28 mRem/h for the CTMFD.

As a separate comparison to the so-called superheated drop detectors (SDD), the detection efficiency of the 4 mL CTMFD was compared with about a 60 mL SDD for which the neutron detection efficiency is quoted by the manufacturer (BTI, Inc.) to vary between 0.33 to 33 bubbles/mrem. This translates into a count rate of up to 33/60-0.55 counts/mrem/mL.

The following table compares the fast neutron detection efficiency of the CTMFD (using PFO at about 8 bar) with the industry standard moderated $BF_3$ (SNOOPY®) detector and also the SDD.

Example 2

This example demonstrates uranium detection in aqueous media at trace (pCi/L) levels with a CTMFD. Such determination is required for municipalities for alpha emitters such as U, Ra, etc. in water, and also, for assessing the possible radiological contamination at nuclear facilities by assessing for such trace concentrations in an individual's urine (which is predominantly (over 95%->9,500 g/L) composed of water, and small quantities of other materials (chiefly: urea—9.3 g/L; chloride—1.9 g/L; sodium—1.17 g/L; potassium—0.75 g/L; creatinine—0.67 g/L). A suitable form of uranium that is water soluble was chosen for monitoring about 10 pCi/L of U in water within an hour compared with alternate techniques which can take days to weeks. In this case, Uranyl Nitrate (UN) was chosen. It is impractical to test for pCi/L concentration bearing water in TMFDs of sizes in the 1 mL to 100 mL volume range. Monitoring for actinides like U requires their concentration to more manageable levels to the 400 pCi/L level range or better still, to avoid having to enter water into TMFDs. This is because the Pneg thresholds for detecting nuclear particles in water are much higher (below –25 bar) and requires unduly stressing the TMFD system.

A method for creating a residue of U after removing the water without any significant loss of the actinide (U) is disclosed. Once the water is removed, the residue is then dissolved in a common TMFD fluid such as acetone, then introduced into the TMFD and the determination or the original uranium concentration in the water bearing sample is determined within minutes.

The first step in development of the methodology involves verifying for absence of loss of dissolved uranium while removing the water solvent. This methodology involved evaporating the water at a rapid enough rate, yet for not losing dissolved uranium. It is known that density of uranium is about 19 g/mL versus only about 1 g/mL for water. Also, the vapor pressure of water is much larger than that for uranium (which remains in solid form) below the normal boiling temperature for water. However, due to the extremely small quantity of uranium in water at the 10 pCi/L level (i.e., <0.5 microgram per liter of water), the individual atoms of uranium may get entrained and carried away with water droplets, if the evaporation process allowed for bulk nucleate boiling. Therefore the water temperature is kept below 95° C. during the water evaporation process. At temperatures significantly over 95° C. nucleate boiling at various locations may initiate randomly this precise level must be determined ahead of choosing the maximum processing temperature.

A sample of Uranyl Nitrate (UN) was prepared in a bottle with 1 g UN in about 100 mL water (total mass 104.084 g).

From this bottle three scintillation vials with about 1 gram of sample fluid each were prepared (samples 112, 113, 114). The remaining sample (101.007 g) was poured into a clean 250 ml beaker, placed on a hot plate, and kept at a monitored temperature to avoid nucleate boiling (90-95° C.) to evaporate the water. This was performed inside a ventilation box. After two hours, 4.792 grams of solution remained in the beaker. From this, three scintillation vials with about 1 gram of solution each were prepared (samples 115, 116, 117). Table 2 below lists the activities recorded in a LS6500 Beckman spectrometer. The counting window was set to wide-range, in order to account for scintillation intensity at all energy ranges of the slowing down alpha particles.

TABLE 2

Variation of dissolved uranium activity with water loss using LS6500 Beekman Spectrometer

| Sample ID | Fluid Mass (g) in vial | Counts (cpm) in wide window |
|---|---|---|
| Background (BKG1) | 0.999 | 87.4 |
| 112 | 1.005 | 11999.8 |
| 113 | 1.004 | 11993.6 |
| 114 | 1.004 | 11874.6 |
| 115 | 1.161 | 256543.8 |
| 116 | 1.152 | 245417.6 |
| 117 | 1.165 | 247893.0 |
| Background (BKG2) | 1.001 | 77.2 |

The three pre and three post concentration samples were averaged, respectively, and corrected for background (1873.7 cpm before, 246535.8 cpm after). The ratio between these two values is 20.76(±0.36) to 1. As mentioned before, the concentration process took the overall sample mass from 101.007 to 4.792 grams. The ratio between these two values is 21.08 to 1. These two ratios, mass difference and activity difference, differ by less than 1σ error which implies that the process of evaporative concentration as chosen for this invention performed as expected. Mass difference and activity difference using evaporative concentration for the case presented are directly correlated.

Using known activity of uranium (in UN), a 10 pCi/L water solution was prepared for sample preparation for CTMFD assessment. The above process was utilized but it was found that to avoid problems with immiscibility and spurious nucleation events the entire water mass should be evaporated and the residue then dissolved directly in the appropriately chosen TMFD fluid which acts as a surrogate solvent and detection fluid simultaneously.

Since the evaporative concentration method proved to be nearly 100% effective at retaining UN, and water mixtures require substantial dilution anyway, it was determined that the evaporative concentration method be continued until no water remains in the sample. Whichever fluid is desired for detection can then be used to re-dissolve the actinide bearing solid residue left after concentration for example 50:50 acetone:isopentane mixture by volume). This process theoretically may also be applied to the radon-bearing water trials to test for solid daughter products. In order to determine the negative pressure required to reach about 100% efficiency for alpha detection, a waiting time curve was measured with the 50:50 acetone:isopentane mixture by volume with uranyl nitrate at 2700 pCi/L concentration.

Figure 7:
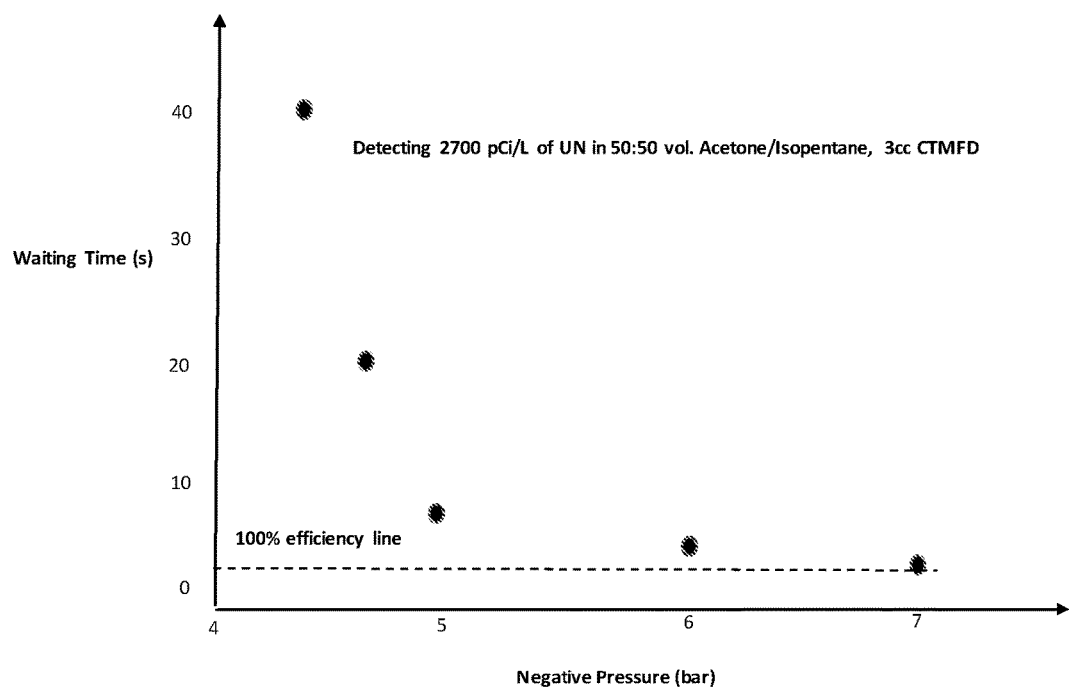
FIG. 7 provides a graph of waiting time versus negative pressure for the CTMFD detection of uranyl nitrate using a detector with a 3 mL fluid volume.

The results are shown in FIG. 7. A detection plateau can be seen for Pneg between −6 bar to −7 bar was noted, which is consistent with expectation based on the known threshold of −10 bar for detection of uranium in acetone and the effects of isopentane mixtures on detection thresholds.

10 pCi/L of uranium in water was also detected using this method. The 10 pCi/L solution previously prepared was poured into a clean 100 ml beaker and kept at a monitored temperature to avoid nucleate boiling (90-95° C.) to evaporate the water. This was accomplished by placing the beaker in a water bath in a ventilation chamber.

Figure 8:
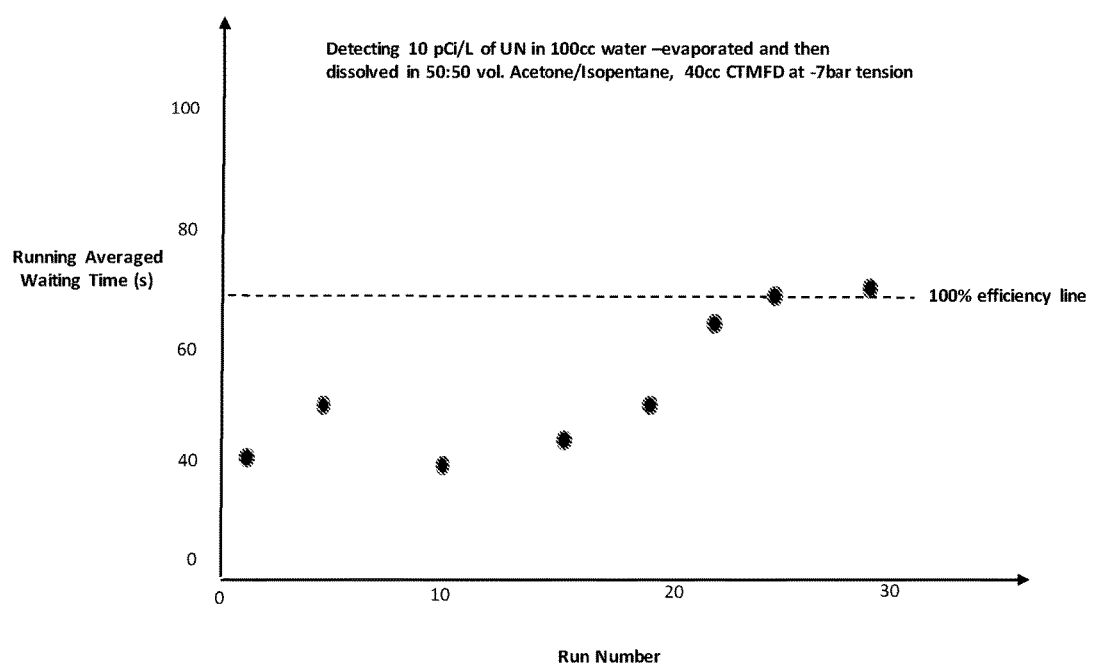
FIG. 8 provides a graph of the average wait time for 20 runs of a sample of UN in a CTMFD detector.

After two hours, the water had completely evaporated and a 100 ml (50:50 mixture of acetone and isopentane) was added and allowed to dissolve the uranyl nitrate for 15 minutes. The test sample was then added to a 40 mL SV CTMFD and tested at −7 bar. The results shown in FIG. 8 demonstrate that within 20 runs (less than a minute each), the average time to detect uranium alpha activity is shown. The expected wait time was calculated to be 66.7 seconds.

The extension of the above-disclosed methodology to detection for other actinides in water (or urine type specimens) such as Radium, Radon, Pu, etc. is straightforward. The various components of urine (such as urea, and enzymes, etc.) are soluble in TMFD fluids like acetone. Samples can be strained through commonly available filters. Also, by maximizing the surface area of the UN bearing water solution will enhance the evaporation rate and bring down the time to concentrate significantly. Using this CTMFD approach with a 40 mL sensitive volume will require an average detection time of about 67 seconds for 10 pCi/L activity. If the activity were higher, for example at about 100 pCi/L, the time to detect would be reduced to about 6.7 seconds. Also, it should be possible to reduce the time needed for detection by using a larger CTMFD. If an 80 mL CTMFD were chosen, the time to detect would be reduced by 50%.

Example 3

Figure 9:
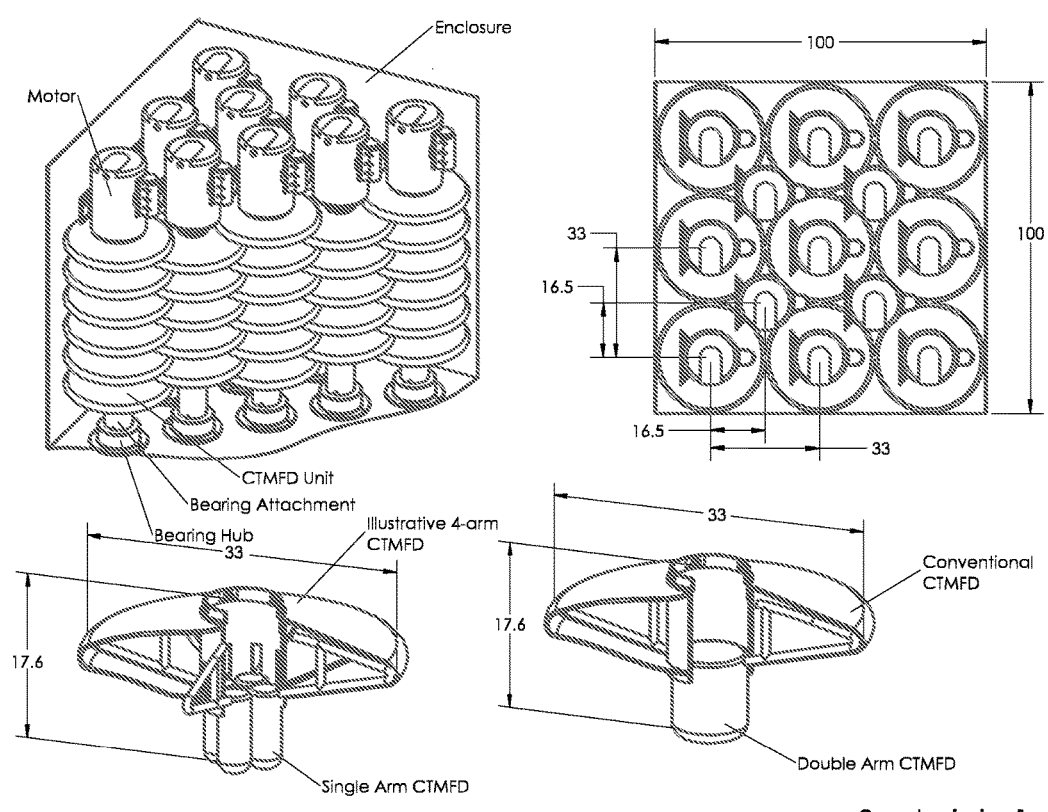
FIG. 9 provides an illustration of an embodiment of a CTMFD based neutron detection array system (dimensions are in cm).

This example demonstrates a CTMFD sensor in large array form that meets or exceeds declared Federal goals for SNM detection. This example demonstrates an array of detectors fit within a 1 m×1 m×1 m enclosure that can detect shielded $^{252}$Cf neutrons with an efficiency approximating 100% higher than that for known He-3 filled detector banks. That is, to enable a detection efficiency (A$\varepsilon_{Cf}$)>1,200 cm$^2$. Based on experiments using isopentane and trimethyl borate, a full scope 3-D simulation was performed to ascertain for the design of an array of CTMFD detectors of a given size (600 mL each) that provides A$\varepsilon_{Cf}$'>1.200 cm$^2$. FIG. 9 depicts the array form in which CTMFDs may be placed to achieve this goal. Table xx below summarizes the results of the tradeoff studies for CTMFDs using either isopentane or trimethyl borate as the sensing fluids, isopentane ($C_5H_{12}$) is to be used to sense fast (MeV energy) neutrons, whereas, trimethyl borate (which includes $^{10}$B isotope with its relatively larger ×100 neutron absorption cross section leading to energetic (n,α) reactions enables down-scattered as well as fast neutrons with higher efficiency overall—this aspect is found from CTMFD experimentation using isopentane as well as trimethyl borate. Evidence for Neutron Detection Intrinsic Efficiencies Vs Pneg for Candidate TMFD Sensors.

We evaluated 2 candidate TMFD fluids: (i) isopentane, and (ii) a mixture of isopentane with trimethyl borate (TMB) and methanol (in 50:45:5 proportion). These fluids were chosen based on our past experience, and also for their ready availability at reasonable cost. R-113 (Lapinskas et al, NED 239, 2009) is also suitable; however, R-113 is no longer in commercial production due to EPA-restrictions. Isopentane and trimethyl borate have also been found to be suitable for use in this work although other similar fluids such as PFO, DFP, acetone, ethanol, as depicted in the table of useful working fluids could also have been used. We utilized our CTMFD apparatus with sensitive volume of ~ice for the scoping studies for detection rates of shielded and unshielded $^{252}$Cf neutrons at various distances and at various Pneg (tension metastable levels); in the past we have obtained data with a 23-50 mL CTMFDs and those limited data were utilized to assess whether the value for intrinsic efficiency obtained with 1 mL scales with the increased sizes of 23 mL to 55 mL volumes.

Experiments to Confirm Intrinsic Efficiency for $^{252}$Cf Neutrons with Isopentane A NIST-certified $^{252}$Cf source (about $1.1 \times 10^5$ n/s) was employed for these studies. Using an MCNP model for 1" polyethelene moderated $^{252}$Cf reveals the spectrum shape change aspects—it leads to about 28% reduction in the fast fluence (>1 MeV) with a commensurate increase in the downscattered fluence. The TMFD technology relies on fast neutron recoils to deliver sufficient energy for detection. Neutrons below 1 MeV require either greater Pneg values (i.e., below −10 bar); downscattered neutrons require a nuclear recoil boost as from (n/α) type reactions, e.g., from neutron capture in $^{10}$B. For isopentane there is no $^{10}$B. Li-6 type recoil ion and fast neutron knock-ons onto C and H atoms. From experimental data it is apparent that at Pneg of −5 bar, only the C recoils are capable of attaining $^{252}$Cf fast neutron detection. The value of $E_{th,recoil}$ for C is determined to be about 120 keV at Pneg of −5 bar. Cosmic neutron background was measured at the rate of about 0.01 cps (i.e., one event every 100 seconds on average) and was not a factor.

The variation of intrinsic efficiency for $^{252}$Cf source detection at various Pneg values was obtained. MCNP calculations (coupled with hand calculations) over the range of neutron energies of $^{252}$Cf indicate that the maximum intrinsic efficiency for a lee TMFD which relies solely on C recoils can at most be about 6.5%. However, if H recoils were also to contribute, the intrinsic efficiency could theoretically rise to about 30%. We experimentally found that for Pneg of −2.5 bar the intrinsic detection efficiency is small (<1%); however, it rises rapidly with Pneg. At Pneg of −5 bar, the efficiency rises to about 6%—which is close to 100% of the theoretical maximum possible for neutron interactions with C atoms alone. By increasing Pneg towards −10 bar, increased the measured intrinsic efficiency to about 15%; this provides evidence that all C recoils and some H recoils are also detected—the intrinsic detection efficiency is already about 50% of the maximum possible intrinsic efficiency even when including neutrons of all energies from $^{252}$Cf.

For integral MCNP-POLIMI code TMFD array detection efficiency simulations in 3-D (including effects of geometry, stacking of columns of TMFD units, shielding, etc.) an estimate of the lower limit of C and H recoil energy is needed for tallies [$E_{th,recoil}$] which result in sufficient energy at a given Pneg (e.g., −10 bar). The well-known and accepted ion transport code. SRIM, was next utilized to calculate the combination LET of proton and Carbon re coils in Isopentane. The Bragg peak for protons in isopentane is ~1 MeV. Therefore any proton with kinetic energy higher than that will experience the highest LET possible for a proton recoil as it is slowing down. Therefore, the energy threshold for the detection of proton recoils is ~1 MeV. Interestingly, the equivalent LET for Carbon occurs at ~250 eV. These two values now establish the $Et_{th,recoil}$ to utilize for net efficiency evaluations when conducting integral assessments. That is, if the CTMFD system's Pneg was set to −5 bar, only those C recoils carrying energies of 120 keV and above will permit detection. However, for Pneg of −10 bar, C recoils of over 250 eV and H recoils of over 1 MeV will allow 1" polyethylene moderated $^{252}$Cf neutron spectrum detection.

We compared our data on intrinsic efficiency taken at Pneg of −5 bar taken previously with a 23 mL CTMFD with a 1 mL TMFD. Results of intrinsic efficiency were commensurate with expectations from the well-known $I/Io = 1 - e^{-\Sigma x}$ law. These comparisons provided positive evidence of successful scalability of intrinsic efficiency with size increases of the CTMFD design by a factor of about 50.

Experimental Evidence for $^{252}$Cf Neutron Detection Efficiency with TMB+IP+M—for Thermalized and Fast Neutrons from Single Unit:

Similar scoping experiments were conducted with a (45:50.5 by volume) mixture of trimethyl borate, isopentane and methanol (TMB+IP+M). TMB includes the Boron (B) element of which, in natural form comprises 20% $^{10}$B (a strong neutron absorber). TMB by itself has previously been shown in TMFD experiments to be capable of detecting (Lapinskas, NED 2009) thermal neutrons via the $^{10}$B(n,α)$^{7}$Li reaction. As mentioned, only about 28% of the $^{252}$Cf source neutrons are moderated to energies below 1 MeV by the 2.5 cm of polyethylene shielding. However, the cross section for thermal neutron capture is significantly higher than the cross section for elastic scattering ($\sigma$,(n,α) 3400b vs. $\sigma_{es}$ 2.4b) and therefore the inclusion of boron can be used to significantly increase detection efficiency (when we consider that the "Q" of the reaction is about 2.34 MeV divided between the alpha (1.5 MeV) and recoiling Li-7 (0.84 MeV) ions). Also although (n,α) reactions are possible with $^{10}$B, these are threshold reactions for which the estimated overall cross-section over the entire $^{252}$Cf energy spectrum is negligibly small (about 64 µb). The TMB+IP+M mixture was tested in experiments with a CTMFD at Pneg up to −5 bar with a shielded (14 cm of paraffin) and unshielded met neutron source (about $1.15 \times 10^5$ n/s) at a distance of 1 m.

Detection results were dramatic. Utilizing MCNP (for estimating the downscattered source fluence) together with experimental data, we derived for the intrinsic detection efficiency for each case as being about 26.4% and about 6.0% for the shielded and unshielded cases respectively. These findings indicate two important results. Firstly, the data with the moderated $^{252}$Cf neutron source indicates that utilizing the TMB mixture as a detection medium provides for a significant boost to the detection efficiency due to the efficient detection of down-scattered (<1 MeV) neutrons all the way down to thermal energies. Secondly, the results indicate that the TMB mixture also performs comparably to isopentane alone, when detecting the presence of an unshielded $^{252}$Cf neutron source when both are operated at Pneg of about −5 bar. This provides a significant improvement over a detection medium reliant on the detection of fast neutrons alone. These data provided a measure for the combined $E_{th,recoil}$ energy from C recoils and from n,α recoils to be about 25 keV if the Pneg is maintained about −5 bar. The data indicate that at −10 bar with the TMB+IP+M mixtures that it should be possible to avail of the H recoils as well and the threshold energies for C-based and H-based recoils would come down to 0.25 keV and 1 MeV, respectively.

Design Estimates for CTMFD Large Area Array Efficiency

Having developed a 3-D stacked array of TMFD sensors that utilize either isopentane or a TMB-based mixture, we next assessed for the detector array of TMFDs composed of either CTMFD or ATMFD units. Assuming that the experimentally derived estimates of intrinsic efficiency would scale with neutron track length, a rough estimate was made for a scaled up TMFD sensitive volume comprising a cylinder (D=10 cm, H=8 cm) TMFD. With Pneg operation at −10 bar in a 600 mL system having a 10 cm long sensitive volume an enhanced intrinsic efficiency of detection of about 78% is obtained as compared to 15% for having a 1 cm long sensitive volume which has an efficiency of about 15%.

This would indicate that the number of 600 mL TMFD units required to meet a detection goal=1,200/(10×8×0.78) or about 19. With about 20 TMFDs having a sensitive volume projected area=80 cm$^2$, and operating with an intrinsic efficiency of about 78% already meets to meet the goal of 1,200 cm$^2$. Thus, it should be readily possible to stack the required 19 TMFD units, each having about a 600 mL sensitive volume in a 1 m$^3$ sized enclosure with room to spare. The space required to position each TMFD is larger than just the space occupied by the sensitive volume of the TMFD. Efficiency reduction from self-shielding and other multi-dimensional effects must also be considered to optimization. Positioning of electronics and drive materials, self-shielding, absorption, must also be considered for optimizing 3-D stacked arrays of CTMFD and/or ATMFDs, respectively.

A stacked array of TMFD sensors for meeting goals using the CTMFD sensor concept a SolidWorks® model was created as shown in FIG. 9. Each CTMFD unit can include a 10 cm (diameter)×8 cm (tall) sensitive volume of about 600 mL. Each CTMFD can be encased in a streamlined aerodynamic enclosure to minimize drag and provide a built-in safety enclosure. Each column of 6 CTMFD units can be driven by a single variable speed motor each CTMFD unit can be monitored in real-time for detection events on a continuous basis with wireless relay of data outside of the panel.

In another embodiment drive motors, detection equipment, timing, the space required for the panel enclosure and electronics, it up to 78 CTMFD units can be included in 13 columns with 6 CTMFDs in each column. The CTMFD based array is shown in FIG. 9. Both forms of CTMFD designs (i.e., the conventional CTMFD as well as the segmented MAC-TMFD) are depicted. The MAC-TMFD allows for non-stop operation and flexible determination of neutron energies using a single multi-volume CTMFD. Each sub-volume is fitted with a remote transmitter to relay detection signals in real-time. Significant flexibility is potentially attainable with modest additional expenditure.

For a 2.5 cm moderated $^{252}$Cf source, a 3-D, MCN-PPOLIMI® simulation was conducted to assess for the value of $A\varepsilon_{Cf}$. In this instance, A=1 m$^2$. The detection efficiency $\varepsilon_{Cf}$ is now defined as the ratio of number of neutron interactions which result in $E_{th,recoil}$ above a certain value (within the sensitive volume of all 78 CTMFDs) divided by the number of neutrons entering the 1 m×1 m face. Results of simulations are shown in Table 1 for CTMFDs using IP alone, and TMB mixtures (with 20% $^{10}$B). TMB mixture (with 99% enriched $^{10}$B) provide for efficiency about 2,100 cm$^2$.

Surprisingly the results indicate that both CTMFD configurations significantly exceed the target $A\varepsilon_{Cf}$ by a wide margin. It was observed that the 1st and 2nd row CTMFD columns (FIG. 9) offered 68% of the overall array efficiency with the remaining 3$^{rd}$ to 5$^{th}$ rows of CTMFD columns offering diminishing returns due to self-shielding. Since an $A\varepsilon_{Cf}$>1,200 cm$^2$ has been achieved with only the 1$^{st}$ and 2$^{nd}$ rows, the system can potentially be reduced in size. Conservative simulations indicate that the 1,200 cm$^2$ goal is possible with smaller systems.

The invention claimed is:

1. A CTMFD radiation detection system comprising a detector assembly comprising a detection fluid, a base, a safety enclosure, a motor and motor mounting bracket, speed sensors, a cooling system comprising an air inlet and outlet, and a safety enclosure, wherein the base further comprises an air intake shaft having bubble sensor holes, vibration dampeners, a holder for a liquid temperature measuring device, shaft supports and attachments for a safety enclosure.

2. The CTMFD radiation detection system of claim 1 wherein the detector arms further comprise a bulb joined to a neck and arms, wherein the interior of the neck is convex and joins the bulb to the arms.

3. The CTMFD radiation detection system of claim 1 wherein the detector comprises a protective coating.

4. The CTMFD radiation detection system of claim 1 wherein the detector comprises support braces.

5. The CTMFD radiation detection system of claim 1 wherein the detection fluid in the arms extends above elbows that connect the upper and lower halves of the arms.

6. The CTMFD radiation detection system of claim 1 wherein the detector further comprises a fill spout.

7. The CTMFD radiation detection system of claim 1 wherein the detector arms have an internal diameter of at least about 6 to about 8 mm or more.

8. The CTMFD radiation detection system of claim 1 wherein the base further comprises an air intake shaft having bubble sensor holes, vibration dampeners comprising suction cup feet, a holder for a liquid temperature measuring device, shaft supports and attachments for a safety enclosure.

9. The CTMFD radiation detection system of claim 1 wherein the detection fluids comprise at least one of R-113, acetone, ethylene chloride, isopentane, methanol, trimethyl borate, PFO, DFP and their mixtures.

10. The CTMFD radiation detection system of claim 1 further comprising an infrared temperature sensor next to the detector bulb for measuring the temperature of the detection fluid.

11. The CTMFD radiation detection system of claim 1 wherein the internal diameter of at least a portion of the tubing in the upper arms is increased relative to the internal diameter of the tubing of the lower arms.

12. The CTMFD radiation detection system of claim 1 wherein the detector comprises detector having a plurality of detector arms having fluids with distinct Pneg requirements.

13. The CTMFD radiation detection system of claim 1 further comprising a battery which powers the motor.

14. The CTMFD radiation detection system of claim 1 further comprising a battery which powers the motor and a separate battery that powers a control microprocessor and display screen.

15. The CTMFD radiation detection system of claim 1 further comprising a pulse width modulation control mechanism for the motor power.

16. A method for detecting radiation using the CTMFD radiation detection system of claim 1 wherein the motor is accelerated in steps taking a sufficient amount of time to avoid false detection events.

17. The method for detecting radiation using the CTMFD radiation detection system of claim 1 wherein the acceleration of the motor is controlled by a transistor circuit that truncates part of the waveform from the AC power.

18. The method for detecting radiation using the CTMFD radiation detection system of claim 1 further comprising a calibration step for controlling detector acceleration comprising running the motor at a plurality of delay values and measuring the detector speed.

19. The method for detecting radiation using the CTMFD radiation detection system of claim 1 further comprising calibrating the motor speed as a function of the heat of the motor.

20. A method for detecting trace actinides in water at concentration levels of under 10 pCi/L by using the CTMFD radiation detection system of claim 1 comprising obtaining one or more CTMFD detectors and identifying a trace actinide and its direction.

21. A CTMFD sensor array arranged to detect radiation with a detection efficiency of about 1,200 cm.sup.2 or more that is gamma and beta blind.

* * * * *